(12) United States Patent
He et al.

(10) Patent No.: US 9,094,960 B2
(45) Date of Patent: Jul. 28, 2015

(54) HYBRID AUTOMATIC REPEAT REQUEST (HARQ) MAPPING FOR CARRIER AGGREGATION (CA)

(71) Applicant: Intel Corporation, Santa Clara, CA (US)

(72) Inventors: Hong He, Beijing (CN); Seunghee Han, Kyoungkido (KR); Jong-Kae Fwu, Sunnyvale, CA (US); Debdeep Chatterjee, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 195 days.

(21) Appl. No.: 13/853,404

(22) Filed: Mar. 29, 2013

(65) Prior Publication Data

US 2013/0322358 A1  Dec. 5, 2013

Related U.S. Application Data

(60) Provisional application No. 61/667,325, filed on Jul. 2, 2012, provisional application No. 61/653,369, filed on May 30, 2012.

(51) Int. Cl.
| | |
|---|---|
| *H04W 4/00* | (2009.01) |
| *H04J 3/00* | (2006.01) |
| *H04W 72/04* | (2009.01) |
| *H04L 12/807* | (2013.01) |
| *H04W 28/12* | (2009.01) |

(Continued)

(52) U.S. Cl.
CPC ......... *H04W 72/0406* (2013.01); *H04L 1/1607* (2013.01); *H04L 1/18* (2013.01); *H04L 1/1887* (2013.01); *H04L 5/00* (2013.01); *H04L 5/001* (2013.01); *H04L 5/0055* (2013.01); *H04L 5/1469* (2013.01); *H04L 47/27* (2013.01); *H04W 28/12* (2013.01); *H04L 1/1812* (2013.01); *Y02E 40/62* (2013.01)

(58) Field of Classification Search
None
See application file for complete search history.

(56) References Cited

U.S. PATENT DOCUMENTS

| | | | | |
|---|---|---|---|---|
| 2012/0099491 | A1* | 4/2012 | Lee et al. | 370/280 |
| 2012/0155413 | A1* | 6/2012 | Liu et al. | 370/329 |
| 2013/0301433 | A1* | 11/2013 | Yin et al. | 370/252 |

OTHER PUBLICATIONS

ASUSTek; PUCCH Resource Allocation Corresponding to ePDCCH; 3GPP TSG RAN WG1 Meeting.#69 R1-122614; Agenda Item 7.6.5; May 21-25 2012; 2 pages; Prague, Czech Republic.

(Continued)

*Primary Examiner* — Afshawn Towfighi
(74) *Attorney, Agent, or Firm* — Thorpe North & Western LLP

(57) ABSTRACT

Technology to support mapping for Hybrid Automatic Retransmission re-Quest (HARQ) for Carrier Aggregation (CA) is disclosed. One method can include a user equipment (UE) identifying, within a radio frame, a type 2 DownLink (DL) sub-frame within a virtual bundling window associated with a Secondary Component Carrier (SCC). The type 2 DL sub-frame can be virtually moved from a Primary Component Carrier (PCC) for HARQ-ACKnowledge (HARQ-ACK) multiplexing of the virtual bundling window. The UE can extract a Component Carrier Element (CCE) number for a first CCE used by a Physical Downlink Control CHannel (PDCCH) transmission corresponding to the type 2 DL sub-frame. The UE can determine a Physical Uplink Control CHannel (PUCCH) resource for carrying a HARQ-ACK multiplexing message based on the CCE number when a PCC window size of the PCC is greater than an SCC window size of the SCC.

24 Claims, 27 Drawing Sheets

(51) Int. Cl.
*H04L 1/18* (2006.01)
*H04L 5/00* (2006.01)
*H04L 1/16* (2006.01)
*H04L 5/14* (2006.01)

(56) References Cited

OTHER PUBLICATIONS

Catt; HARQ-ACK feedback for TDD inter-band CA; 3GPP TSG RAN WG1 Meeting #69 R1-122031; Agenda Item 7.2.1.5; May 21-25, 2012; 3 pages; Prague, Czech Republic.
Ericsson; PUCCH resource mapping; 3GPP TSG-RAN WG1 #69 R1-121988; Agenda Item 7.2.1.5; May 21-25, 2012; 3 pages; Prague, Czech Republic.
Nokia Siemens Networks; HARQ-ACK resource allocation for data scheduled via ePDCCH;.3GPP TSG-RAN WG1 Meeting #69 R1-122428; Agenda Item 7.6.5; May 21-25, 2012; 2 pages; Prague, Czech Republic.
Pantech; PUCCH resource allocation in response to E-PDCCH; 3GPP TSG-RAN1 #69 R1-122456; Agenda Item 7.6.5; May 21-25, 2012; 3 pages; Prague, Czech Republic.
3GPP TS 36.211 v10.1.0; $3^{rd}$ Generation Partnership Project; Technical Specification Group Radio Access Network; Evolved Universal Terrestrial Radio Access (EUTRA); Physical Channels and Modulation; Mar. 2011; 103 pages; Release 10.
3GPP TS 36.213; v10.1.0; $3^{rd}$ Generation Partnership Project; Technical Specification Group Radio Access Network; Evolved Universal Terrestrial Radio Access (E-UTRA); Physical layer procedures; Mar. 2011; 115 pages; Release 10.
PCT Application PCT/US2013/041223; filing date May 15, 2013; Intel Corporation, et al.; International Search Report mailed Sep. 12, 2013.

* cited by examiner

| UL-DL configuration for PDSCH HARQ timing reference | | SCell SIB1 UL-DL configuration | | | | | | |
|---|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

FIG. 5
(Table 3)

| Value of "TPC command for PUCCH" (ARI) | $\left(n^{(2)}_{PUCCH,0}, \cdots, n^{(2)}_{PUCCH,M-1}\right)$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

FIG. 9
(Table 4)

| Value of 'TPC command for PUCCH' | $(n^{(1)}_{PUCCH,j}, n^{(1)}_{PUCCH,j+1}, n^{(1)}_{PUCCH,j+2})$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

FIG. 12
(Table 5)

| HARQ-ACK (0), HARQ-ACK (1) (in step 3-0) | HARQ-ACK (0), HARQ-ACK (1),HARQ(2), HARQ(3) (in step 3-1) | |
|---|---|---|
| DTX, any | DTX, any, DTX, DTX | |
| ACK,ACK | ACK,ACK,DTX,DTX | |
| NACK,NACK/DTX | NACK,NACK/DTX,DTX,DTX (→ it can be eventually be mapped to NACK,any,any,any for a legacy mapping table) | |
| ACK,DTX/NACK | ACK,DTX,DTX,DTX(Alternative 1) | ACK, ACK, ACK, NACK/DTX(Alternative 2) |
| NACK,ACK | ACK, ACK, ACK, NACK/DTX (Alternative 1) | ACK, DTX, DTX, DTX (Alternative 2) |

FIG. 15
(Table 6)

| HARQ-ACK (0), HARQ-ACK (1) (In step 3-0) | HARQ-ACK (0), HARQ-ACK (1),HARQ(2) (in step 3-1) |
|---|---|
| DTX, any | DTX, any, DTX |
| ACK,ACK | ACK,ACK,DTX |
| NACK,NACK/DTX | NACK,NACK/DTX,DTX |
| ACK,DTX/NACK | ACK,DTX/NACK,DTX |
| NACK,ACK | ACK, ACK, ACK |

FIG. 16
(Table 7)

| Index | $M_1=2$ | $M_2=3$ or $M_1=3$ | $M_2=4$ |
|---|---|---|---|
| | HARQ-ACK(0), HARQ-ACK(1) | HARQ-ACK(0), HARQ-ACK(1), HARQ-ACK(2) | HARQ-ACK(0), HARQ-ACK(1), HARQ-ACK(2), HARQ-ACK(3) |
| 0 | ACK, NACK/DTX → | ACK, NACK/DTX, any → | ACK, DTX, DTX, DTX |
| 1 | NACK/DTX, ACK → | ACK, ACK, NACK/DTX → | ACK, ACK, NACK/DTX, any |
| 2 | ACK, ACK → | ACK, ACK, ACK → | ACK, ACK, ACK, NACK/DTX |
| 3 | DTX, DTX/NACK → | DTX, any, any → | DTX, any, any, any |
| 4 | NACK, NACK/DTX → | NACK/DTX, any, any → | N, any, any, any |

Sharing the same mapped PUCCH state after channel selection

FIG. 17
(Table 8)

| HARQ-ACK(0), HARQ-ACK(1) | $n_{PUCCH}^{(1)}$ | $b(0), b(1)$ |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | No transmission | |

FIG. 22
(Table 9)

| HARQ-ACK(0), HARQ-ACK(1), HARQ-ACK(2) | $n_{PUCCH}^{(1)}$ | $b(0), b(1)$ |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | No transmission | |

FIG. 23
(Table 10)

| HARQ-ACK(0), HARQ-ACK(1), HARQ-ACK(2), HARQ-ACK(3) | $n^{(1)}_{PUCCH}$ | $b(0),b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | No transmission | |

FIG. 24
(Table 11)

| HARQ-ACK(0), HARQ-ACK(1) | $n_{PUCCH}^{(1)}$ | $b(0)b(1)$ |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

FIG. 25
(Table 12)

| HARQ-ACK(0), HARQ-ACK(1), HARQ-ACK(2) | $n_{PUCCH}^{(1)}$ | $b(0)b(1)$ |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

FIG. 26
(Table 13)

| HARQ-ACK(0), HARQ-ACK(1), HARQ-ACK(2), HARQ-ACK(3) | $n^{(1)}_{PUCCH}$ | $b(0)b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | No Transmission | |

FIG. 27
(Table 14)

| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation $b(0), b(1)$ | RM Code Input Bits $o(0), o(1), o(2), o(3)$ |
|---|---|---|---|---|
| ACK, ACK, ACK | ACK, ACK, ACK | $n^{(1)}_{PUCCH,1}$ | 1, 1 | 1,1,1,1 |
| ACK, ACK, NACK/DTX | ACK, ACK, ACK | $n^{(1)}_{PUCCH,1}$ | 0, 0 | 1,0,1,1 |
| ACK, NACK/DTX, any | ACK, ACK, ACK | $n^{(1)}_{PUCCH,3}$ | 1, 1 | 0,1,1,1 |
| NACK/DTX, any, any | ACK, ACK, ACK | $n^{(1)}_{PUCCH,3}$ | 0, 1 | 0,0,1,1 |
| ACK, ACK, ACK | ACK, ACK, NACK/DTX | $n^{(1)}_{PUCCH,0}$ | 1, 0 | 1,1,1,0 |
| ACK, ACK, NACK/DTX | ACK, ACK, NACK/DTX | $n^{(1)}_{PUCCH,3}$ | 1, 0 | 1,0,1,0 |
| ACK, NACK/DTX, any | ACK, ACK, NACK/DTX | $n^{(1)}_{PUCCH,0}$ | 0, 1 | 0,1,1,0 |
| NACK/DTX, any, any | ACK, ACK, NACK/DTX | $n^{(1)}_{PUCCH,3}$ | 0, 0 | 0,0,1,0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 |

FIG. 28
(Table 15)

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | $b(0), b(1)$ | $o(0), o(1), o(2), o(3)$ |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |

FIG. 29
(Table 16)

| HARQ-ACK(0), HARQ-ACK(1), HARQ-ACK(2), HARQ-ACK(3) | Mapped state |
|---|---|
| 'D, any, any, any' or no DL assignment is received. | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

FIG. 30
(Table 17)

| HARQ-ACK(0), HARQ-ACK(1), HARQ-ACK(2) | Mapped state |
|---|---|
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

FIG. 31
(Table 18)

| PCC b0 | PCC/SCC b1 | SCC b2 | SCC b3 | PUCCH A/N resource (h#) RA & Data | Data Constant |
|---|---|---|---|---|---|
| D | N/D | N/D | N/D | DTX | |
| N | N/D | N/D | N/D | h0 | 1 |
| A | N/D | N/D | N/D | h0 | -1 |
| N/D | A | N/D | N/D | h1 | -1 |
| A | A | N/D | N/D | h1 | 1 |
| N/D | N/D | A | N/D | h2 | 1 |
| A | N/D | A | N/D | h2 | -1 |
| N/D | A | A | N/D | h2 | 1 |
| A | A | A | N/D | h3 | -1 |
| N/D | N/D | N/D | A | h0 | 1 |
| A | N/D | N/D | A | h3 | -1 |
| N/D | A | N/D | A | h0 | -1 |
| A | A | N/D | A | h3 | 1 |
| N/D | N/D | A | A | h3 | -1 |
| A | N/D | A | A | h1 | 1 |
| N/D | A | A | A | h1 | -1 |

1 bit | 2 bit | 3 bit | 4 bit

FIG. 32
(Table 19)

HYBRID AUTOMATIC REPEAT REQUEST (HARQ) MAPPING FOR CARRIER AGGREGATION (CA)

RELATED APPLICATIONS

This application claims the benefit of and hereby incorporates by reference U.S. Provisional Patent Application Ser. No. 61/653,369, filed May 30, 2012, and U.S. Provisional Patent Application Ser. No. 61/667,325, filed Jul. 2, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). Time-division duplexing (TDD) is an application of time-division multiplexing (TDM) to separate downlink and uplink signals (or separate signals to a UE or from the UE in D2D communication). In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission (or a transmission to and from a UE in D2D communication) can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 (i.e., Table 3) illustrates a table of an UpLink-DownLink (UL-DL) configuration number of Physical Downlink Shared CHannel (PDSCH) Hybrid Automatic Retransmission re-Quest-ACKnowledge (HARQ-ACK) timing reference for a Secondary Cell (SCell) in accordance with an example;

FIG. 9 (i.e., Table 4) illustrates a table of a physical uplink control channel (PUCCH) resource value for hybrid automatic repeat request-acknowledgement (HARQ-ACK) with ACK/negative ACK (ACK/NACK) Resource Indicator (ARI) in accordance with an example;

FIG. 12 (i.e., Table 5) illustrates a table of a physical uplink control channel (PUCCH) resource value according to acknowledgement (ACK)/negative ACK (ACK/NACK) Resource Indicator (ARI) in accordance with an example;

FIG. 15 (i.e., Table 6) illustrates a table used for hybrid automatic repeat request-acknowledgement (HARQ-ACK) generatioin for a cell with a HARQ-ACK bundling window size M1=2 for a case M1=2 and M2=4 in accordance with an example;

FIG. 16 (i.e., Table 7) illustrates a table used for hybrid automatic repeat request-acknowledgement (HARQ-ACK) generation for a cell with a HARQ-ACK bundling window size M1=2 for a case M1=2 and M2=3 in accordance with an example;

FIG. 17 (i.e., Table 8) illustrates a table of a hybrid automatic repeat request-acknowledgement (HARQ-ACK) look-up mapping table for different uplink-downlink (UL-DL) configurations of inter-band time division duplex (TDD) carrier aggregation (CA) in accordance with an example;

FIG. 22 (i.e., Table 9) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-2) in accordance with an example;

FIG. 23 (i.e., Table 10) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-3) in accordance with an example;

FIG. 24 (i.e., Table 11) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-4) in accordance with an example;

FIG. 25 (i.e., Table 12) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-5) in accordance with an example;

FIG. 26 (i.e., Table 13) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-6) in accordance with an example;

FIG. 27 (i.e., Table 14) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-7) in accordance with an example;

FIG. 28 (i.e., Table 15) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-5) in accordance with an example; and FIG. 29 (i.e., Table 16) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-6) in accordance with an example.

FIG. 30 (i.e., Table 17) illustrates a table of a transmission of hybrid automatic repeat request-acknowledgement (HARQ-ACK) multiplexing for a bundling window size of M=4 in accordance with an example;

FIG. 31 (i.e., Table 18) illustrates a table of a transmission of hybrid automatic repeat request-acknowledgement (HARQ-ACK) multiplexing for a bundling window size of M=3 in accordance with an example; and FIG. 32 (i.e., Table 19) illustrates a table of a hybrid automatic repeat request-acknowledgement (HARQ-ACK) mapping table for physical uplink control channel (PUCCH) format 1b with channel selection (CS) in accordance with an example.

Figure 1:
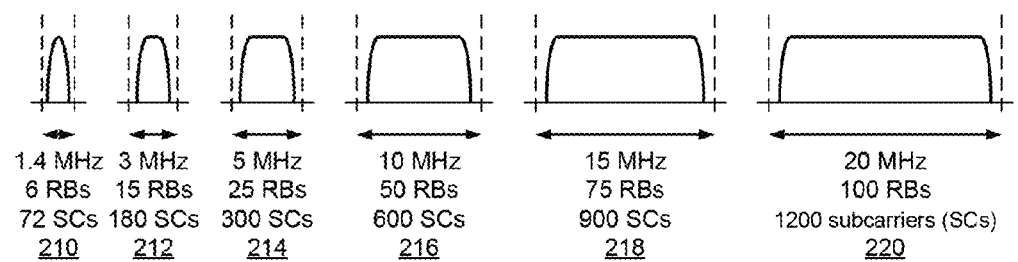
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
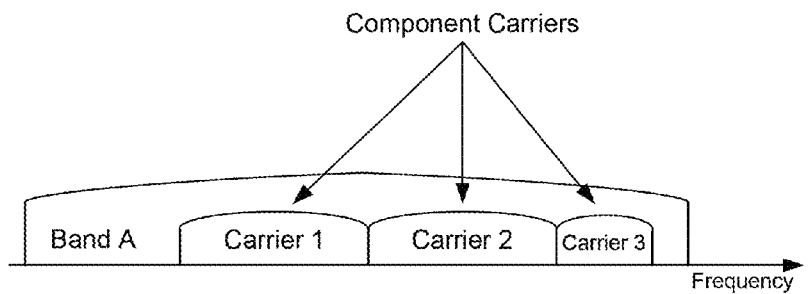
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
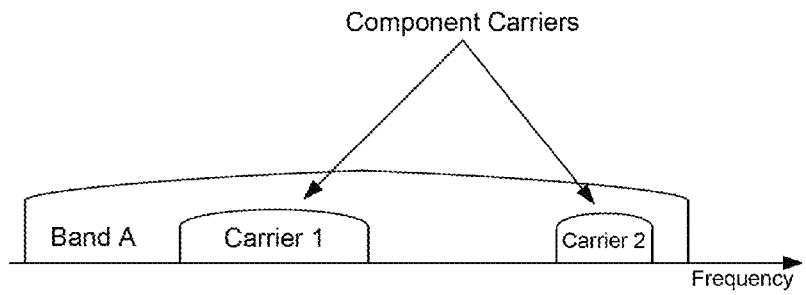
FIG. 2B illustrates a block diagram of intra-band non-contiguous component carriers in accordance with an example.
Figure 2C:
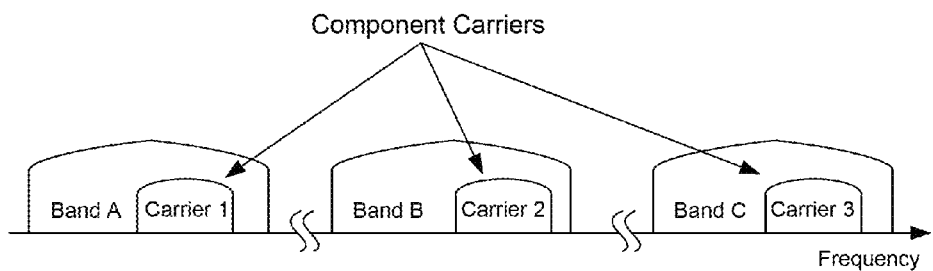
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
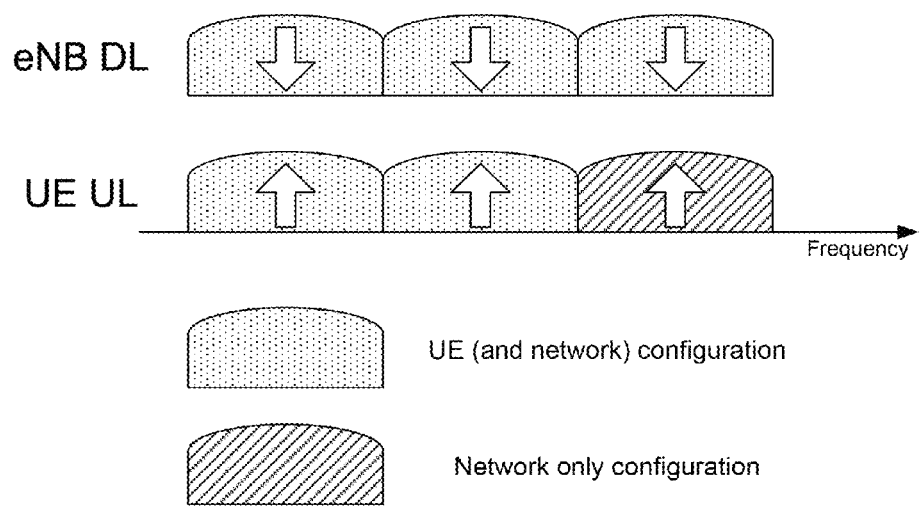
FIG. 3A illustrates a block diagram of a symmetric-asymmetric carrier aggregation configuration in accordance with an example.
Figure 3B:
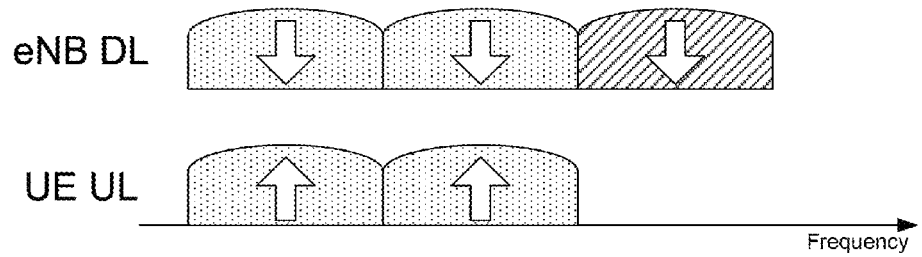
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and PUCCH resource allocations (RA). If more than one CC is configured for a UE, the additional CCs can be denoted as secondary cells (SCells) for the UE.

Figure 4:
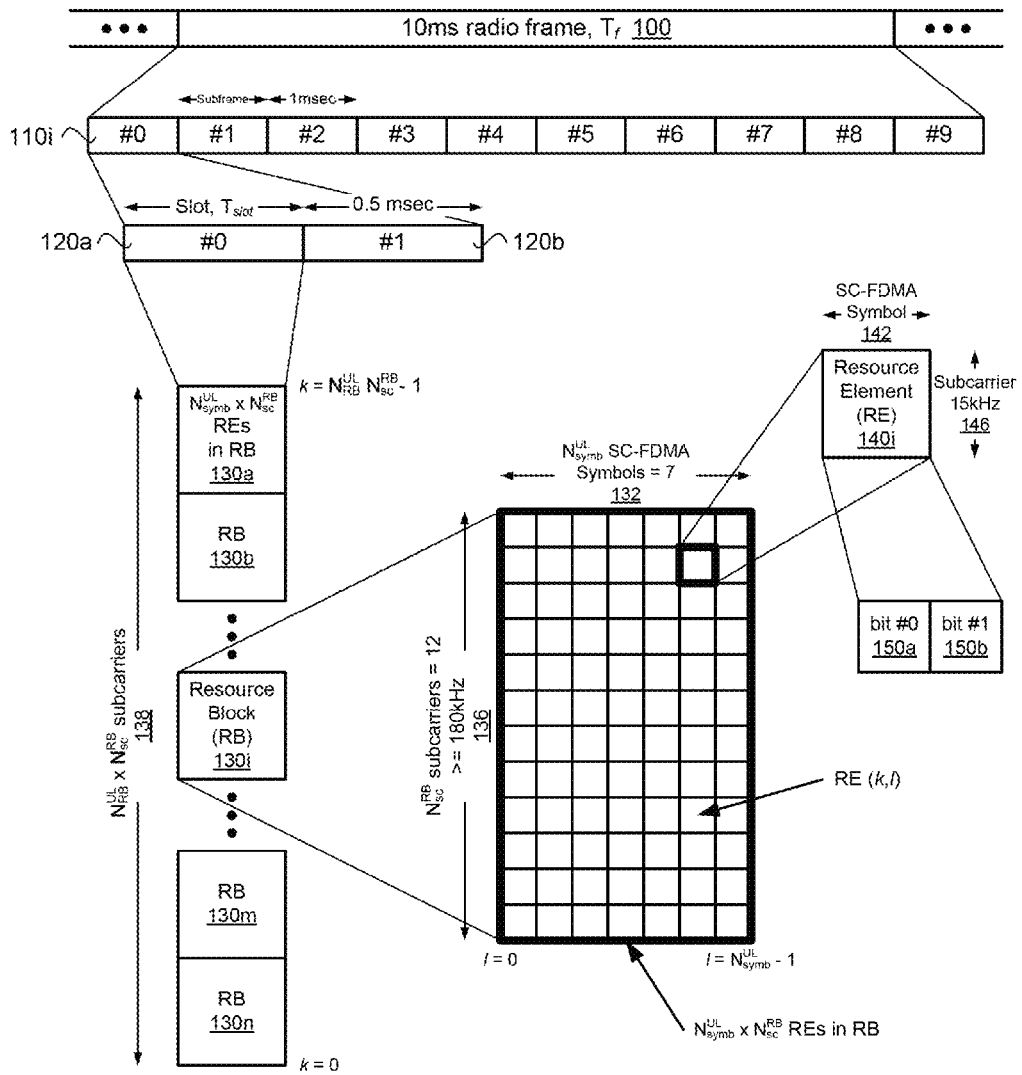
FIG. 4 illustrates a block diagram of uplink radio frame resources (e.g., a resource grid) in accordance with an example.

A component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates an uplink radio frame structure. A similar structure can be used for a downlink radio frame structure using OFDMA. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device (e.g., UE) can provide HARQ-ACK feedback for a PDSCH using a PUCCH. The PUCCH can support multiple formats (i.e., PUCCH format) with various modulation and coding schemes (MCS), as shown for LTE in Table 1. Similar information to Table 1 can be shown in 3GPP LTE standard Release 11 (e.g., V11.1.0 (2012 December)) Technical Specification (TS) 36.211 Table 5.4-1. For example, PUCCH format 1b can be used to convey a two-bit HARQ-ACK, which can be used for carrier aggregation.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Legacy LTE TDD can support asymmetric UL-DL allocations by providing seven different semi-statically configured uplink-downlink configurations. Table 2 illustrates seven UL-DL configurations used in LTE, where "D" represents a downlink subframe, "S" represents a special subframe, and "U" represents an uplink subframe. In an example, the special subframe can operate or be treated as a downlink subframe. Similar information to Table 2 can be shown in 3GPP LTE TS 36.211 Table 4.2-2.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 2, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9.

As an underlying requirement in some examples, cells of the network can change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 2. The UL and DL subframes allocation within a radio frame can be reconfigured through system information broadcast signaling (e.g., system information block [SIB]). Hence, the UL-DL allocation once configured can be expected to vary semi-statically.

A property of TDD is that a number of UL and DL subframes can be different as shown in Table 2 and often the number of DL subframes can be more than the number of UL subframes for a radio frame. In configurations where more DL subframes are used than UL subframes, multiple DL subframes can be associated with one single UL subframe for the transmission of a corresponding control signals. A configuration-specific HARQ-ACK timing relationship can be defined (e.g., 3GPP LTE standard Release 11 (e.g., V11.1.0 (2012 December)) TS 36.213 Table 10.1.3.1-1). If a UE is scheduled in a multiple of DL subframes, which can be associated with one UL subframe, the UE can transmit multiple ACK/NAK (ACK/NACK) bits in that UL subframe. A number of DL subframes with HARQ-ACK feedback on one single UL subframe can comprise one bundling window.

Figure 6:
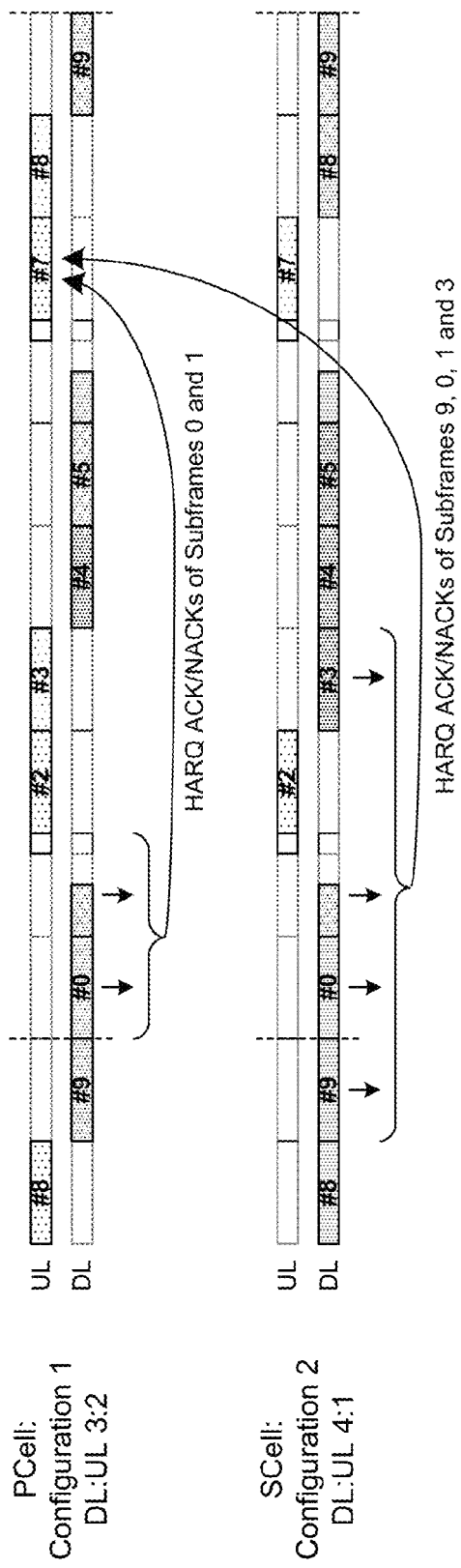
FIG. 6 illustrates varied hybrid automatic repeat request-acknowledgement (HARQ-ACK) bundling window size of Primary Cell (PCell) and a Secondary Cell (SCell) for inter-band time division duplex (TDD) carrier aggregation (CA) (e.g., different UL-DL configurations) in accordance with an example.

As shown in FIG. 6, the subframe 0 and 1 can comprise one bundling window on a PCell according a predefined HARQ-ACK timing relation for UL-DL configuration 1, while correspondingly, subframe 9 of previous radio frame, subframe 0, 1 and 3 comprise the HARQ-ACK bundling window on a SCell according to the HARQ-ACK timing defined for configuration 2 for uplink subframe 7. In an example, HARQ-ACK bundling window may not be used for configuration 5, with 9 DL subframes.

An advantage of a Time Division Duplex (TDD) system can be a flexible resource utilization through different TDD configurations to better match the uplink and downlink traffic characteristics of the cell. By configuring different TDD configurations, the ratio between available UpLink (UL) and DownLink (DL) resources can range from 3UL:2DL (6UL:4DL) to 1 UL:9DL. In legacy LTE TDD (e.g., LTE Release 10 (Rel-10) specification), only the aggregation of TDD Component Carriers (CCs) of a same UL-DL configuration may be defined and supported. While the same UL-DL configuration can simplify a design and operation of CC, the same UL-DL configuration can also impose some limitations.

In an example, inter-band carrier aggregation (CA) for a TDD system with different uplink-downlink configurations on different bands can be supported. For instance, more than one TDD carrier can be deployed by a single TDD operator and the carriers can be aggregated at a single base station (e.g., node). Besides, a separation between two carrier frequencies can be large enough to avoid UL-DL interference from a same device. Some of the benefits of inter-band CA with different TDD configurations on different bands can be include (1) legacy system co-existence, (2) heterogeneous network (HetNet) support, (3) aggregation of traffic-dependent carriers, (4) flexible configuration (e.g., more UL subframe in lower bands for better coverage, and more DL subframes in higher bands), and (5) higher peak rate.

Supporting Inter-band TDD Carrier Aggregation (CA) with different uplink-downlink configurations can be used to aggregate component carriers (CC) with different DL/UL configurations. To provide high peak data rate enhancement benefits to both full- and half-duplex UEs, HARQ (Hybrid Automatic Repeat reQuest) ACK/NACK feedback for downlink (DL) data may use a PUCCH only transmitted on Primary Cell (PCell), use legacy HARQ-ACK timing for PCell PDSCH by following a PCell SIB type 1 (SIB1) UL-DL configuration, and use HARQ-ACK timing for the PDSCH of a Secondary Cell (SCell) following a specific reference UL-DL configuration (e.g., PCell and SCell UL-DL configuration) as shown in Table 3 illustrated in FIG. 5.

Interband TDD CA with different UL-DL configurations in different bands can be supported. For example, an SCell PDSCH HARQ reference timing can be determined from a PCell UL-DL configuration and a SCell UL-DL configuration, as shown in Table 3 illustrated in FIG. 5. Table 3 (i.e., FIG. 5) illustrates the UL-DL configuration number of PDSCH HARQ-ACK timing reference for SCell. A HARQ-ACK timing of PCell PDSCH, the scheduling timing of PCell PUSCH, the HARQ timing of PCell PUSCH can use the PCell SIB1 configuration. A UE can be configured with PUCCH format 3 or PUCCH format 1b with channel selection (CS) for HARQ-ACK transmission for TDD inter-band carrier aggregation (CA) with different UL-DL configurations on different bands.

According to the HARQ-ACK timing table (i.e., Table 3) for the SCell PDSCH, the size of HARQ-ACK bundling window can be different between PCell and SCell. FIG. 6 illustrates an example where the PCell is configured with TDD UL/DL configuration 1 and SCell is configured with TDD UL/DL configuration 2. Since the SCell can follow a different DL HARQ timing from the PCell, not only the bundling window of the SCell can be different from the PCell, but also the number of the HARQ-ACK bits (corresponding to the number of the DL subframes) in the SCell bundling window can be different from the PCell bundling window. As a result, legacy HARQ-ACK bit mapping and bundling rules may no longer applicable for a SCell UL-DL configuration with a different UL-DL configuration from the PCell or legacy HARQ-ACK bit mapping and bundling rules may no longer support a case with the SCell UL-DL configuration different from the PCell UL-DL configuration.

FIG. 6 illustrates varied HARQ-ACK bundling window sizes of the PCell and the SCell in case of inter-band TDD CA. An implication of different UL-DL configurations can be that different number of downlink subframes can be bundled within bundling window in each cell. For example, as shown in FIG. 6, a PCell can use TDD configuration 1 and an SCell can use a TDD configuration 2. As illustrated, the size of bundling windows associated with the UL subframe 7 can be different for the two serving cells (e.g., PCell and SCell). For the PCell, the HARQ-ACK bundling window size is 2 comprising subframe {0,1}, while for SCell, the HARQ-ACK bundling window size is 4 comprising subframe {9,0,1,3}, as shown in FIG. 6. FIG. 6 illustrates different HARQ-ACK bundling windows in a TDD inter-band CA scenario.

Several solutions can be used in a case where the SCell UL-DL configuration differs from the PCell UL-DL configuration. For example, a 'virtual' HARQ-ACK bundling window generation operation or HARQ-ACK "look-up" mapping table can be proposed to improve a Downlink (DL) throughput. An additional issue for PUCCH format 1b channel selection mode b can be PUCCH resources mapping for mode b. In a legacy intra-band CA, the PUCCH resource mapping in case of non-cross-CC scheduling can include: Two PUCCH resources for PCell that can be implicitly derived from PDCCHs having DAI=1, 2 (DAI is a downlink assignment index) for PCell when the PDSCH without PDCCH (e.g., semi-persistent scheduling (SPS)) is not present; two PUCCH resources for PCell that can be derived from a SPS resource and a PDCCH having DAI=1 for a PCell when PDSCH without PDCCH (e.g., SPS) is present; or two PUCCH resources for SCell that can be indicated by a ARI (ACK/NACK Resource Indicator).

Figure 7:
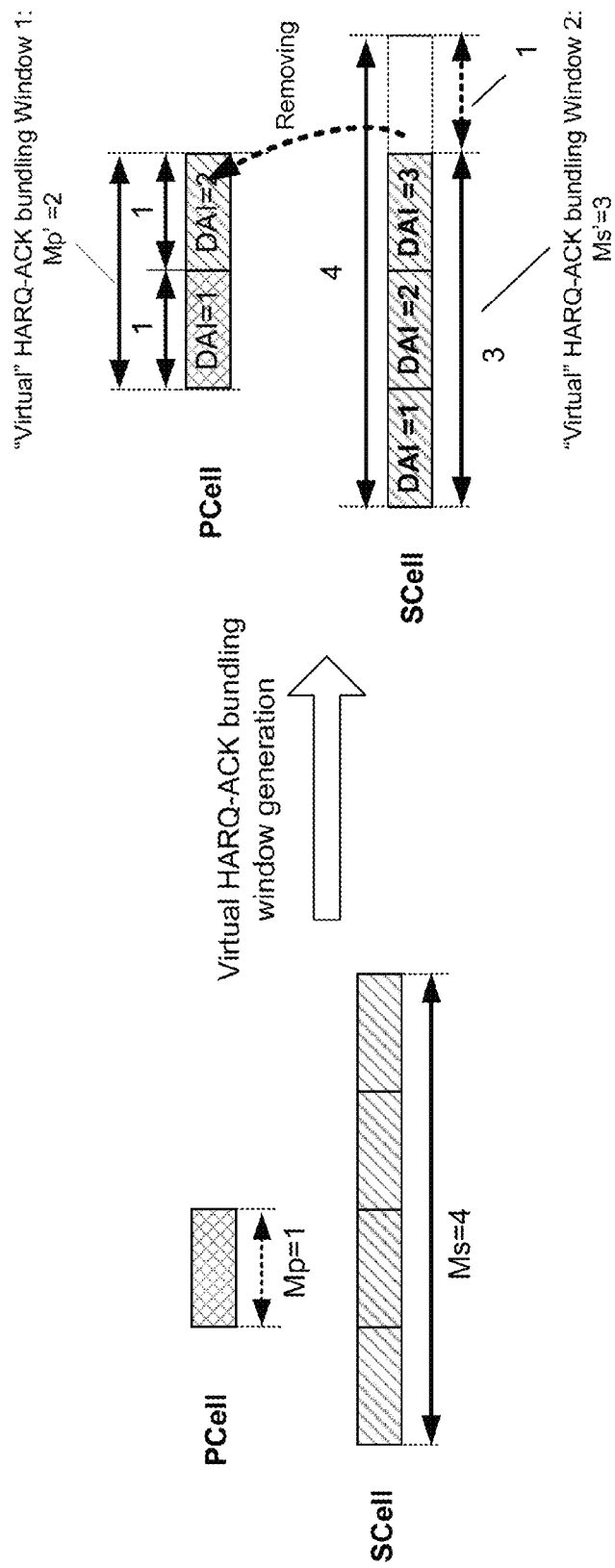
FIG. 7 illustrates a virtual hybrid automatic repeat request-acknowledgement (HARQ-ACK) bundling window generation process in accordance with an example.

A legacy PUCCH resource mapping method may not be directly applied for a 'virtual' HARQ-ACK bundling window generation method. FIG. 7 illustrates an example of a 'virtual' HARQ-ACK bundling window generation method. As shown in the right of FIG. 7, a DL subframe with "DAI=2" in the PCell bundling window can be "virtually" taken from the SCell, the DAI value can be counted based on the generated virtual bundling. However, a corresponding PUCCH resources in a PUCCH resource mapping table may not be implicitly derived from the PDCCHs having 'DAI=2' on PCell, to avoid a potential PUCCH resource collision between CA and none-CA capable UEs. PUCCH resources mapping methods for various PUCCH feedback schemes can be defined to complete a PUCCH channel selection with a format 1b design for inter-band CA.

To facilitate the descriptions and illustrations used herein, two types of PDSCH subframes can be defined per CC according to a particular downlink subframe handing in a "virtual" HARQ-ACK bundling window construction process as shown in FIG. 7. A type 1 subframe can include a subframe which is not "removed" from one Cell to the other (e.g., from the PCell to the SCell or the SCell to the PCell) for "virtual" HARQ-ACK bundling window construction. A type 2 subframe can be a subframe which is "virtually" removed from one Cell to the other (e.g., from the PCell to the SCell or the SCell to the PCell) to generate the "virtual" HARQ-ACK bundling window.

Figure 8:
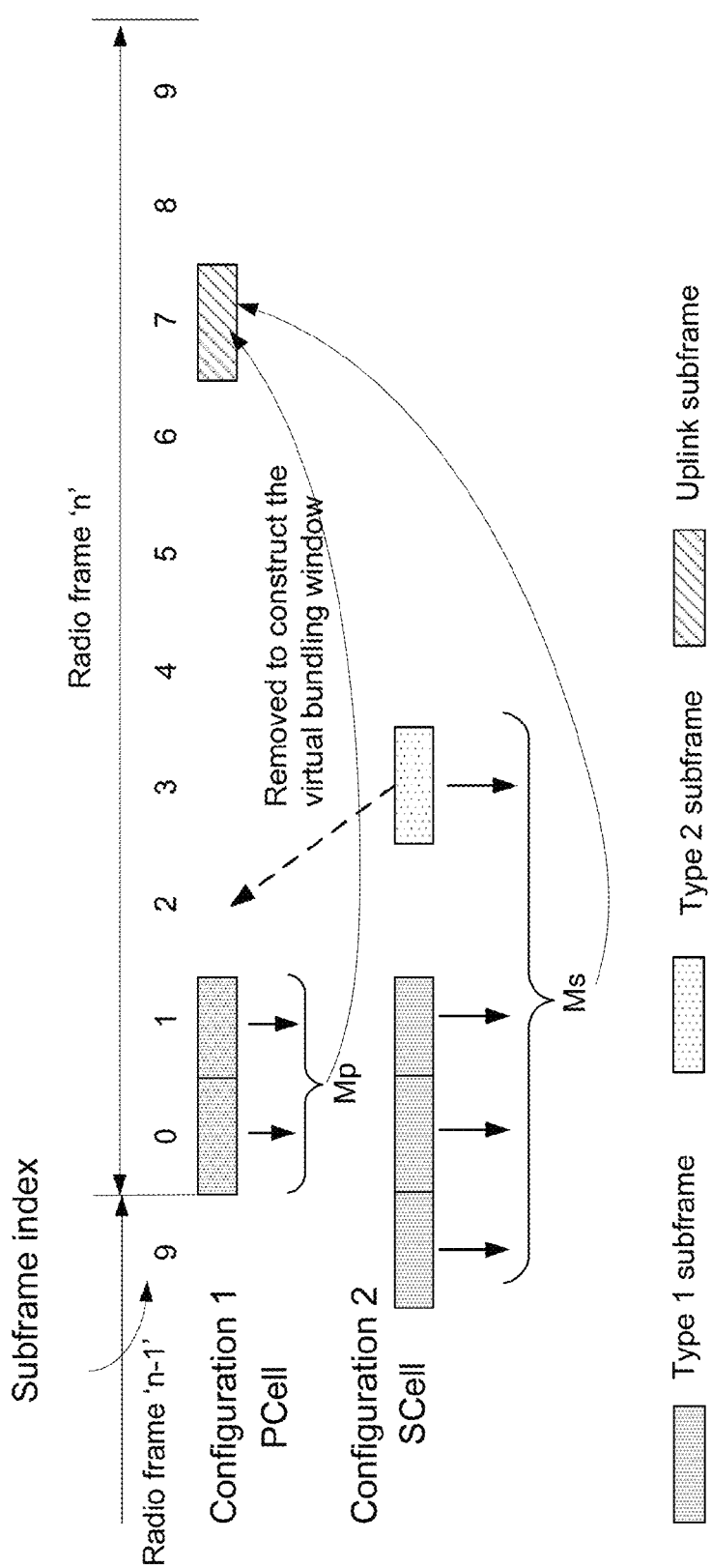
FIG. 8 illustrates physical downlink shared channel (PDSCH) subframe types definition for a virtual hybrid automatic repeat request-acknowledgement (HARQ-ACK) bundling window generation method in accordance with an example.

FIG. 8 illustrates an example of PDSCH subframe types definition for a virtual HARQ-ACK bundling window generation method. FIG. 8 illustrates a TDD UL-DL configuration 1 on PCell and configuration 2 on SCell. According to the definition of subframe types, the DL subframes can be the type 1 subframe except for subframe #3 on SCell can be a type 2 subframe. $M_p$ can represent a bundling window size for the PCell and $M_s$ can represent a bundling window size for the SCell, unless otherwise specified.

Various methods (at least four different methods) for deriving PUCCH resources can be performed for a corresponding PDCCH with the DAI value equal to '1' or '2' is carried on a type 2 subframe after a cross-CC DAI counting operation.

In a first method (i.e., method 1), PUCCH resources corresponding to type 2 subframe(s) can be signaled by Radio Resource Control (RRC) signaling. As shown in Table 4 illustrated in FIG. 9, four sets of PUCCH channels indexed by a transmit power control (TPC) command (e.g., '00', '01', '10', and '11') can be configured by RRC signaling with a one-to-one association between type 2 downlink subframes and each set of PUCCH channels. Each set of PUCCH channels can comprise of $$M = \min\left\{\frac{|M_p - M_s|}{2}, 2\right\}$$

explicit PUCCH 1a/1b channels, which can be expressed as $(n_{PUCCH,0}^{(2)}, \ldots n_{PUCCH,M-1}^{(2)})$. Table 4 illustrates a PUCCH resource value for HARQ-ACK with the ARI. The ARI (e.g., TPC command) can be further used to determine the PUCCH resource values from one of the four resource sets configured by higher layers when a "DAI=1" or "DAI=2" is detected on the type 2 subframe(s) as illustrated by example case A or case B.

In the Case A, when $M_p < M_s$ and substantially simultaneously PDSCH with "DAI=1" is transmitted on type 2 subframe on the PCell, a default PUCCH resource (e.g., a 1st PUCCH resource value configured by higher layers) can be used by the UE. Alternatively, the UE can assume the same ARI value using TPC bits of SCell as an index to one of the four PUCCH resources indices configured by RRC, with the mapping defined in Table 4 (i.e., FIG. 9). Case A and case B can be considered separately after one specific PUCCH resources set is selected.

Case A can apply without semi-persistence scheduling (SPS) PDSCH transmission on both the PCell and the SCell. After a virtual bundling window operation, if the downlink assignment index (DAI) value in the PDCCH of type 2 subframe 'i', (0≤i≤M−1) equal to 'j', (j=1 or 2), then a corresponding PUCCH channel value can be determined by Expression 1:

$$\begin{cases} n_{PUCCH,j-1}^{(1)} = n_{PUCCH,i}^{(2)} & \text{if } M_p < M_s \\ n_{PUCCH,j+1}^{(1)} = n_{PUCCH,i}^{(2)} & \text{if } M_p > M_s \end{cases} \quad \text{[Expression 1]}$$

Figure 10:
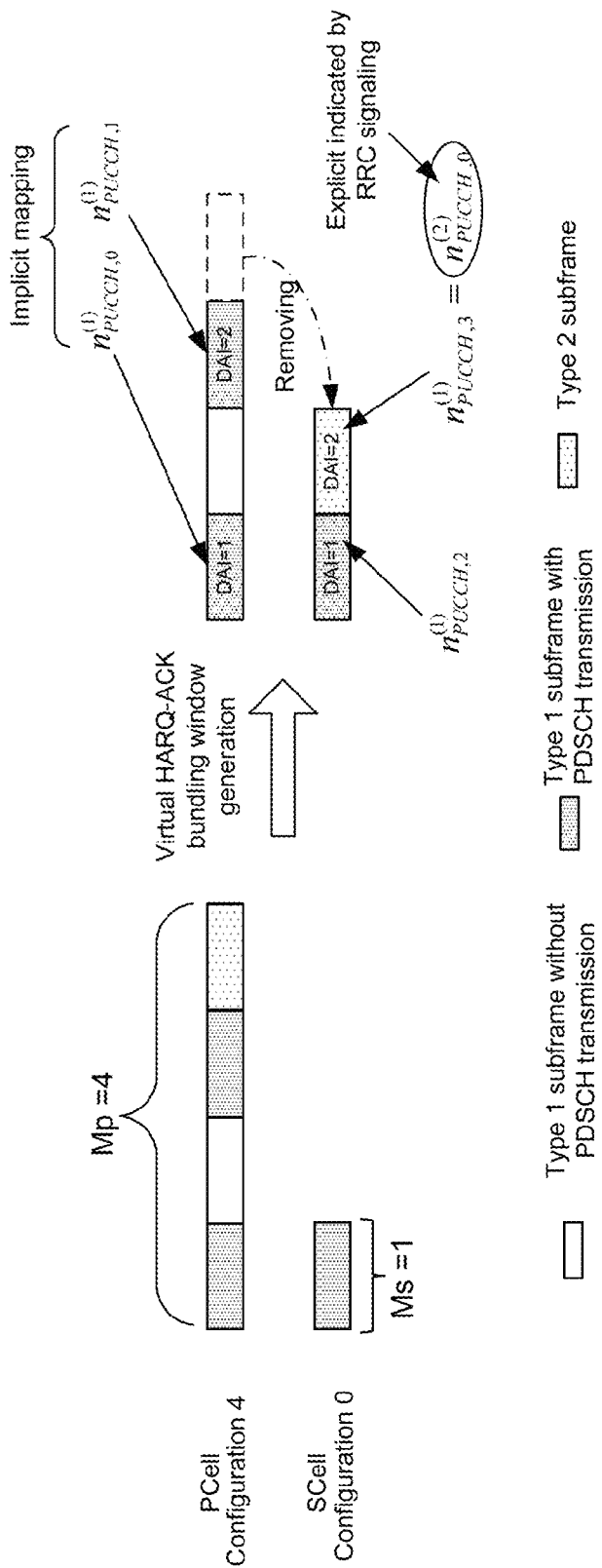
FIG. 10 illustrates a physical uplink control channel (PUCCH) resource mapping for hybrid automatic repeat request-acknowledgement (HARQ-ACK) feedback for a first case in accordance with an example.

FIG. 10 illustrates an embodiment where $M_p=4$ and $M_s=1$, which can occur with a configuration 4 on the PCell and a configuration 0 on the SCell. For a proposed scheme (e.g., $M_p=4$ and $M_s=1$), $$M = \min\left\{\frac{|M_p - M_s|}{2}, 2\right\} = \min\{1, 2\} = 1.$$

Four sets of PUCCH channels can be used where each set comprises of one PUCCH 1a/1b channel. For example, if the ARI value is equal to "10", then the PUCCH channel of the 3rd PUCCH resource value configured by the higher layers (e.g., RRC signaling) can be selected by UE, indicated as $n_{PUCCH,0}^{(2)}$. As shown in FIG. 10, $n_{PUCCH,0}^{(2)}$ can be used for HARQ-ACK feedback when the PDSCH is transmitted on the type 2 subframe. FIG. 10 illustrates an example PUCCH resource mapping for HARQ-ACK feedback in the Case A.

Figure 11:
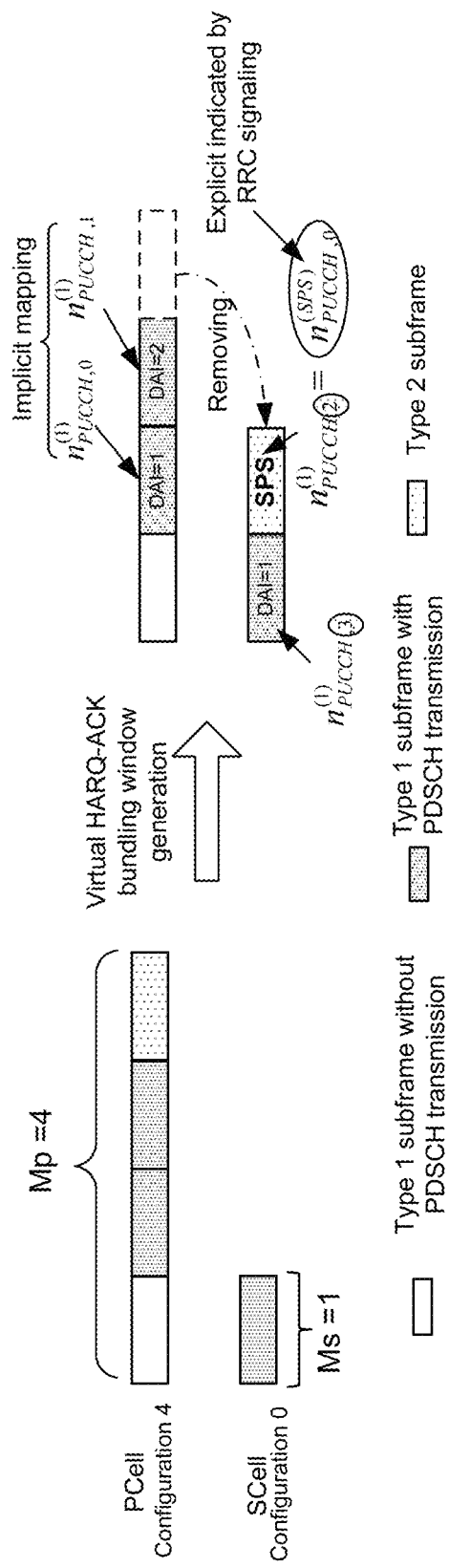
FIG. 11 illustrates a physical uplink control channel (PUCCH) resource mapping for hybrid automatic repeat request-acknowledgement (HARQ-ACK) feedback for a second case in accordance with an example.

Case B can apply when one of the type 2 subframes is a PDSCH transmission without a corresponding PDCCH detected (i.e., the subframe is scheduled by semi-persistent scheduling (SPS)), as illustrated in FIG. 11. Case B can occurs when $M_p \geq M_s+2$. A similar PUCCH resources mapping operation to Case A can be applied to Case B except the following operations can be used: A HARQ-ACK(0) can be an acknowledgement (ACK), Negative ACK (NACK), or discontinuous transmission (DTX) response (i.e., ACK/NACK/DTX response) for a SPS PDSCH transmission and the corresponding value of $n_{PUCCH,2}^{(1)}$ can be determined according to PUCCH resources configured by a higher layer, denoted as $n_{PUCCH,0}^{(SPS)}$. A $n_{PUCCH,3}^{(1)} = n_{PUCCH,i}^{(2)}$ when "DAI=1" is detected in the PDCCH of type 2 subframe 'i', (0≤i≤M−1). Using an example with the configuration 4 on the PCell and the configuration 0 on the SCell, case B can be illustrated in FIG. 11 with a type 2 subframe used as SPS PDSCH. FIG. 11 illustrates an example PUCCH resources mapping for HARQ-ACK feedback in the Case B.

In an alternate first method (i.e., method 1-1 or another explicit resource allocation method), a maximum of two PUCCH resources can be given by RRC signaling and the ARI usage. The TPC values in downlink control information (DCI) for the PCell can be used as real TPC and the TPC values for the SCell can be used as ARI. In an example where $M_s \geq M_p+2$ (where $M_p \leq 1$, $M_s \leq 1$), the type 2 subframe can be virtually moved from the SCell to the PCell. If the DAI value in type 2 subframe is 1 or 2, the PUCCH resource induced by a type 2 subframe may not be obtained since the maximum number of explicit PUCCH resources is two. Therefore, another solution can be: The eNB configures four sets of PUCCH resources and each set consists of three PUCCH resources; then, the TPC field in DL assignment used as the ARI (e.g., for the SCell and for the type 2 subframe) indicates actual PUCCH resource set to be used (e.g., using Table 5 illustrated in FIG. 12); and the ARIs can be the same for the DL subframes except for the DL subframes used as real TPC. Table 5 (i.e., FIG. 12) illustrates a table of a PUCCH resource value according to the ARI (e.g., the TPC command for PUCCH).

In another method (e.g., second method or method 2), flexible PUCCH resources mapping can be associated with type 2 subframe(s). Method 1 can provide a common PUCCH resources mapping solution to enable a virtual bundling window method applicable for the various UL-DL configurations combinations (e.g., PCell and SCell UL-DL configurations combinations). For method 1, the control overhead can be large considering the PUCCH resources associated with type 2 subframes can be reserved by the eNB (e.g., node) if PUCCH format 1b with channel selection is configured. Another solution can be used to reduce the control overhead in a case where $M_p > M_s$, as illustrated below.

If the type 2 PDSCH is a PDSCH transmission indicated by the detection of corresponding PDCCH or a PDCCH indicates a downlink SPS release, the PUCCH resources associated with the type-2 subframe 'i', (0≤i≤M−1) can be implicitly mapped using Expression 2.

$$n_{PUCCH,i}^{(2)} = (M-m-1) \times N_p + m \times N_{p+1} + n_{CCE} + N_{PUCCH}^{(1)} \quad \text{[Expression 2]}$$

where $N_{PUCCH}^{(1)}$ is configured by higher layer, $N_p = \max\{0, \lfloor [N_{RB}^{DL} \times (N_{sc}^{RB} \times p-4)]/36 \rfloor\}$, p is a value out of $\{0, 1, 2, 3\}$ which makes $N_p \leq n_{CCE} < N_{p+1}$ and 'm' is the DAI index value of type 2 subframe within the bundling window on PCell before removing the type 2 subframe (from the PCell to the SCell) to construct the virtual bundling window, and $n_{CCE}$ is the number of a first CCE used for transmission of the corresponding PDCCH in type-2 subframe 'i', while $M = M_p$ which indicates the bundling window size before type-2 subframe removing.

For a PUCCH resource associated with type 2 PDSCH without a corresponding PDCCH detected (e.g., SPS) explicit PUCCH resource can be configured by RRC signaling as in the method 1. For a case of $M_p < M_s$, explicit resources configuration can be used for type-2 subframes as the method 1. After the corresponding PUCCH resources $(n_{PUCCH,0}^{(2)}, \ldots, n_{PUCCH,M-1}^{(2)})$ are generated, a same one-to-one mapping method between $n_{PUCCH,i}^{(1)}$ (0≤i≤3) and $n_{PUCCH,j}^{(2)}$ (0≤j≤M−1) as in method 1 can be used for the HARQ-ACK feedback to utilize a legacy mapping table (e.g., Tables 9-16 illustrated in FIGS. 22-29).

In another method (e.g., third method or method 3), a common HARQ-ACK bundling window selection with a specific HARQ-ACK states padding operation can be used. The third method can differ from previous methods and may not be based on a PUCCH resources mapping of virtual bundling windows generation method. In method 3, a HARQ-ACK feedback candidate scheme can be used for inter-band TDD CA. Compared with method 1 and method 2, a legacy PUCCH resources mapping rule for PUCCH format 1b with channel selection can be fully reused by method 3 which can use less standardization for legacy HARQ-ACK multiplexing tables.

Figure 13:
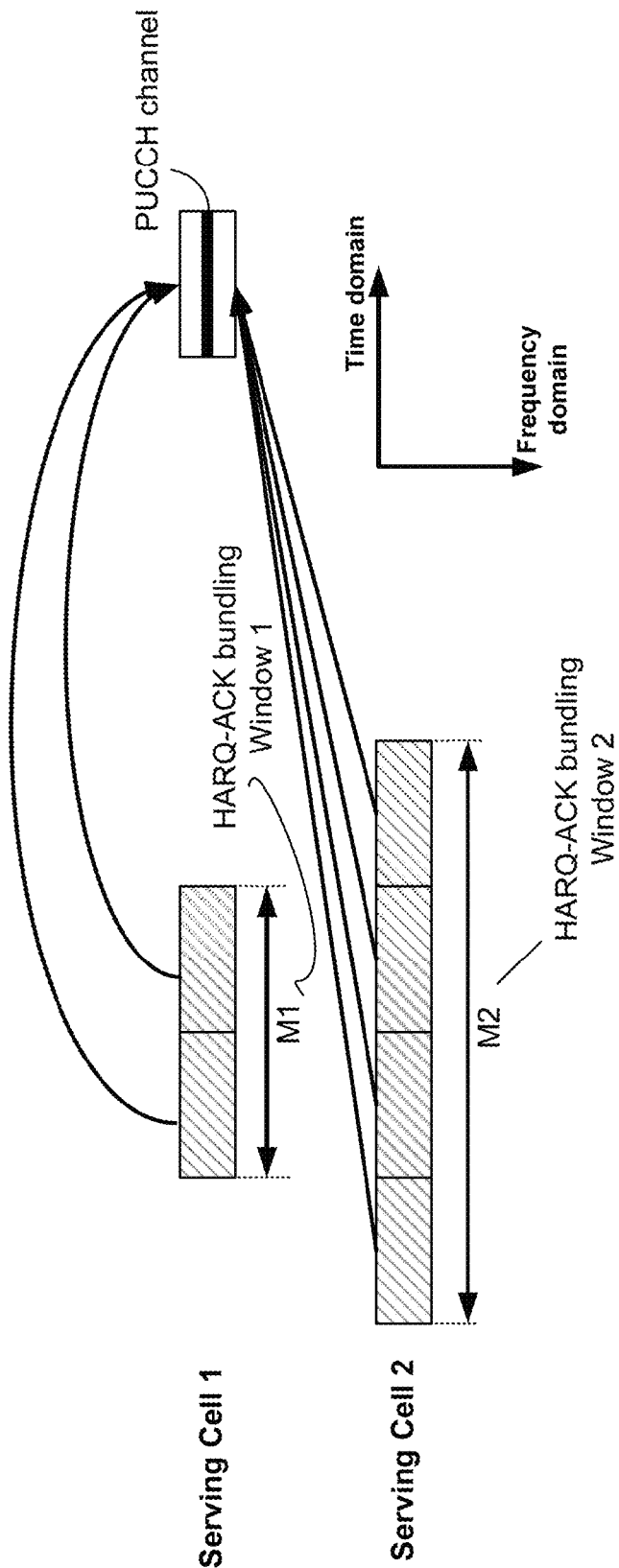
FIG. 13 illustrates different hybrid automatic repeat request-acknowledgement (HARQ-ACK) bundling windows in time division duplex (TDD) inter-band carrier aggregation (CA) scenario in accordance with an example.

As shown in FIG. 13 and for illustration purposes, a smaller bundling window size can be referred to as $M_1$ and the size of the corresponding larger bundling window associated with a same single uplink subframe for PUCCH HARQ-ACK transmission can be referred to as $M_2$. FIG. 13 schematically illustrates a HARQ-ACK bundling window size for inter-band TDD CA.

In an example, the UE can determine a HARQ-ACK(j) where 0≤j≤M−1 for each serving cell. In a first operation (e.g., step 1), a common bundling window size can be determined, where one common HARQ-ACK bundling window size "M" is determined as $M = \max(M_1, M_2)$. According to the definition of $M_1$ and $M_2$, the expression (or equation) for a common bundling window size calculation can be further simplified as "$M = M_2$". The UE can perform channel selection according to a legacy channel selection mapping tables (e.g., Tables 9-16 illustrated in FIGS. 22-29) corresponding to bundling window size 'M'.

In a second operation (e.g., step 2), spatial HARQ-ACK bundling across multiple codewords within a DL subframe can be performed when the transmission mode (TM) configured for the serving cell supports up to two transmission blocks (TBs). In another example, spatial HARQ-ACK bundling across multiple codewords within a DL subframe can be performed when the transmission mode (TM) configured with the serving cell as one of the cells with $M_1=0$ and $M_2=1$.

In a third operation (e.g., step 3), the HARQ-ACK(j) can be generated where $0 \leq j \leq M-1$. The third operation can transform the bundling window size $M_1$ for the smaller cell (e.g., PCell or SCell) to the bundling window size $M_2$ for the larger cell. The bundling window size min $(M_1, M_2)$ can be different from a legacy design. For illustration purposes, $M_1 < M_2$ can be used. The third operation can include two sub-steps, referred as 3-0 (or operation 3-0) and step 3-1 (or operation 3-1). For a serving cell with bundling window size "$M_1$", the UE can generate HARQ-ACK(j), $0 \leq j \leq M-1$ for the PDSCH transmission within the bundling window according to a legacy HARQ-ACK state mapping principle first (i.e., step 3-0). Then, in step 3-1, the UE can append the $(M-M_1)$ additional HARQ-ACK(i) with a predetermined state (e.g., 'DTX'; any predetermined value such as ACK, NACK, or DTX can possible to be appended as long as the predetermined value is known by the eNB and the UE) where $M_1 \leq i \leq M-M_1-1$ when spatial HARQ-ACK bundling is performed or a single TB configured. The DTX appending can be referred to as DTX padding. In another example, any state (e.g., ACK, NACK, or DTX) chosen autonomously by the UE may also be possible, but the illustration is shown based on a 'DTX' state. In another configuration, the UE can append a $2 \times (M-M_1)$ additional HARQ-ACK(i) with state 'DTX' where $M_1 \leq i \leq M-M_1-1$ except for special cases (e.g., Case 1 and Case 2).

Figure 14:
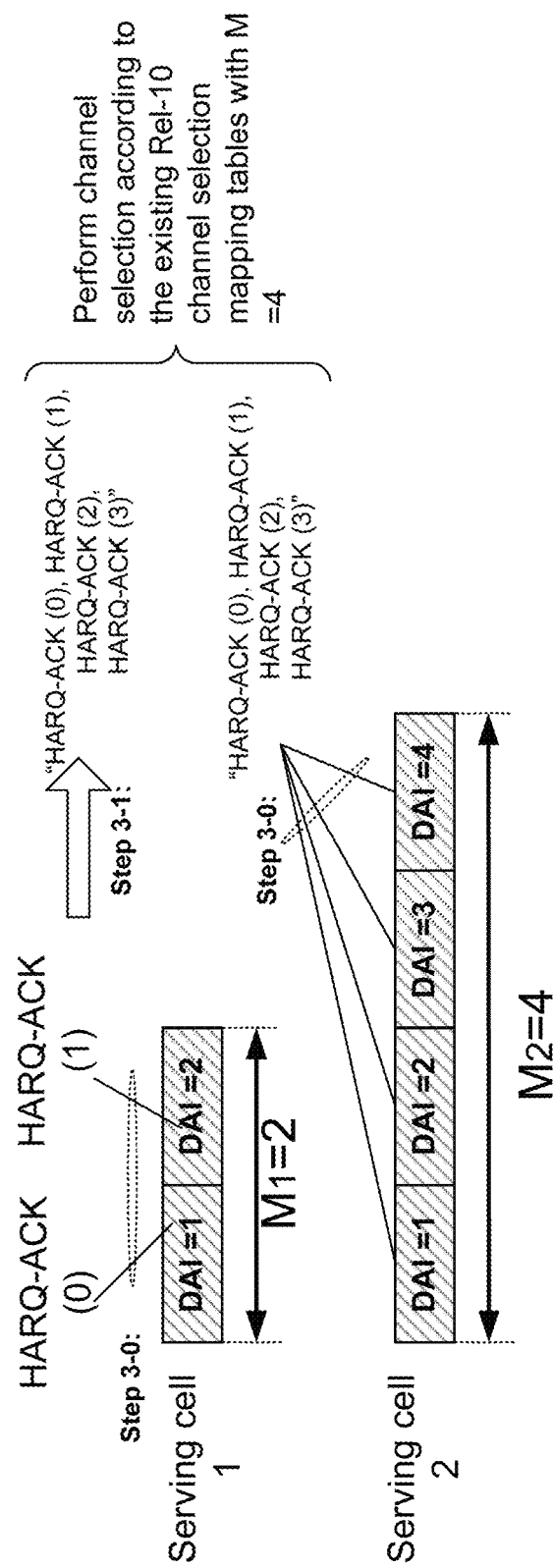
FIG. 14 illustrates hybrid automatic repeat request-acknowledgement (HARQ-ACK) state mapping for HARQ-ACK bundling window sizes M1=2 and M2=4 in accordance with an example.

FIG. 14 schematically illustrates HARQ-ACK states mapping for a case 1 (e.g., $M_1=2$ and $M_2=4$) assuming a PDSCH transmission in every DL subframe. In case 1, $M_1=2$, $M_2=4$ and (HARQ-ACK(0), HARQ-ACK(1)) can be initially mapped as (ACK, NACK) or (NACK, ACK) in step 3-0 for the cell with $M_1=2$ by following a legacy mapping method.

For case 1, in step 3-1, instead of DTX appending, (ACK, NACK) is further mapped to (ACK, DTX, DTX, DTX) and (NACK, ACK) is mapped to (ACK, ACK, ACK, NACK/DTX). Or alternatively, (ACK, NACK) is further mapped to (ACK, ACK, ACK, NACK/DTX) and (NACK, ACK) is mapped to (ACK, DTX, DTX, DTX). Without the a special rule, the 'ACK,NACK' can be automatically mapped to 'ACK, NACK,DTX,DTX' according to a 'DTX padding' principle. For a case that $M_1=2$ and $M_2=4$, the HARQ-ACK(j) where $0 \leq j \leq M-1$ can be summarized in Table 6 illustrated in FIG. 15. Table 6 (i.e., FIG. 15) illustrates a table used for HARQ-ACK generation for the cell with $M_1=2$ in the case of $M_1=2$ and $M_2=4$.

In case 2, $M_1=2$, $M_2=3$ and the (HARQ-ACK(0), HARQ-ACK(1)) can be mapped as (NACK,ACK) for the cell with $M_1=2$ in step 3-0 by following a legacy (LTE Release 10 (Rel-10)) HARQ-ACK mapping method.

For case 2, the UE can further map the HARQ-ACK feedback to a corresponding HARQ-ACK state as (HARQ-ACK (0), HARQ-ACK(1), HARQ-ACK(2)=(ACK,ACK, ACK) in step 3-1. For a case that $M_1=2$, $M_2=3$, a HARQ-ACK states generation can be summarized in Table 7 illustrated in FIG. 16. Table 7 (i.e., FIG. 15) illustrates a table used for HARQ-ACK generation for the cell with $M_1=2$ in the case of $M_1=2$ and $M_2=3$.

In a fourth operation (e.g., step 4), the UE can perform channel selection using legacy channel selection mapping tables corresponding to bundling window size 'M' according to the mapped HARQ-ACK(j) in step-3 for each cell where $0 \leq j \leq M \leq 1$. The PUCCH resource mapping method can fully reused a legacy scheme for PUCCH format 1b with channel selection. In an example, a scheme for PUCCH format 1b with channel selection can be described in section 10.1.3.2.1 of 3GPP LTE TS 36.213 V11.1.0 (Release 11).

In another example, the UE can determine the bundling window size for M in carrier aggregation by $max(M_1,M_2)$. For the serving cell having the smaller bundling window size, the predetermined state (e.g., DTX) can be padded by "max $(M_1,M_2)-min(M_1,M_2)$" with exception of certain states. For example, in case of $min(M_1,M_2)=2$ and $max(M_1,M_2)=4$, the state of "ACK,NACK" for the serving cell with $min(M_1,M_2)=2$ can be mapped to "ACK,DTX,DTX,DTX" for the legacy mapping table. In case of $min(M_1,M_2)=2$ and $max(M_1,M_2)=4$, the state of "NACK,ACK" for the serving cell with min $(M_1,M_2)=2$ can be mapped to "ACK,ACK,ACK,NACK/DTX" for the legacy mapping table. In case of $min(M_1,M_2)=2$ and $max(M_1,M_2)=3$, the state of "NACK,ACK" for the serving cell with min $(M_1,M_2)=2$ can be mapped to "ACK,ACK, ACK" for the legacy mapping table. Then, the legacy mapping table can be applied for channel selection where ACK represents a successful decoding for the corresponding PDSCH, the NACK represents decoding failure for the corresponding PDSCH, and DTX represents that the UE does not transmit any acknowledgement to PDSCH due to decoding fail for the corresponding PDCCH.

In an alternative example, the UE can determine the bundling window size for M in carrier aggregation by $max(M_1, M_2)$. For the serving cell with smaller bundling window size, the predetermined state (e.g., DTX) can be padded by "max $(M_1,M_2)-min(M_1,M_2)$" with exception of certain states. For example, in case of $min(M_1,M_2)=2$ and $max(M_1,M_2)=4$, the state of "ACK,NACK" for the serving cell with $min(M_1,M_2)=2$ can be mapped to "ACK,ACK,ACK,NACK/DTX" for the legacy mapping table. In case of $min(M_1,M_2)=2$ and $max(M_1, M_2)=4$, the state of "NACK,ACK" for the serving cell with $min(M_1,M_2)=2$ can be mapped to "ACK,DTX,DTX,DTX" for the legacy mapping table. In case of $min(M_1,M_2)=2$ and $max(M_1,M_2)=3$, the state of "NACK,ACK" for the serving cell with $min(M_1,M_2)=2$ can be mapped to "ACK,ACK, ACK" for the legacy mapping table. Then, the legacy mapping table can be applied for channel selection where ACK represents a successful decoding for the corresponding PDSCH, the NACK represents decoding failure for the corresponding PDSCH, and DTX represents that UE does not transmit any acknowledgement to PDSCH due to decoding fail for the corresponding PDCCH.

In another method (e.g., fourth method or method 4), a HARQ-ACK look-up mapping table can be defined before reusing the legacy mapping table. FIG. 17 illustrates a HARQ-ACK "look-up" mapping table shown as Table 8. Table 8 illustrates a HARQ-ACK look-up mapping table for different UL-DL configuration of inter-band TDD CA. For a UE configured with PUCCH format 1b with channel selection for HARQ-ACK transmission, a procedure to determine the PUCCH resources can be described by four operation (e.g., steps).

In a first operation (e.g., step 1), the UE can selects the legacy mapping table with $M=max (M_1,M_2)=M_2$ for HARQ feedback on PUCCH, where $M_1$ is the number of PDSCH subframe for the cell with smaller HARQ-ACK bundling window size and $M_2$ is the number of PDSCH subframe for the cell with the larger HARQ-ACK bundling window size.

In a second operation (e.g., step 2), for the PDSCH on the CC with bundling window size $M_1$, HARQ-ACK (j)

($0 \leq j < M_1$) can be generated as the ACK/NACK/DTX response for the PDSCH transmission with corresponding PDCCH and DAI value in the PDCCH equal to 'j+1' or for the PDCCH indicating downlink SPS release and with DAI value in the PDCCH equal to 'j+1'. Then, using the look-up table, as shown in Table 6 (i.e., FIG. 15) for M=4 or Table 7 (i.e., FIG. 16) for M=3, the UE can re-map the HARQ-ACK (j) ($0 \leq j < M_1$) to a corresponding state characterized with a same index sharing, marked with HARQ-ACK (k) ($0 \leq k < M_2$). For example, assume that $M_1$=2, $M_2$=4 and {ACK, NACK} is generated based on PDSCH detection. Then after {ACK, NACK} is mapped, the UE can re-map the {ACK, NACK} to a corresponding HARQ-ACK state with the same index of $M_2$=4, that is the state {ACK, DTX, DTX, DTX}.

In a third operation (e.g., step 3), the HARQ-ACK mapping for the CC with bundling window size $M_2$ can be a same size as a legacy HARQ-ACK mapping table and marked as HARQ-ACK (m) ($0 \leq m < M_2$).

In a fourth operation (e.g., step 4), the UE can perform channel selection based on the HARQ-ACK states HARQ-ACK (k) ($0 \leq k < M_2$) and HARQ-ACK (m) ($0 \leq m < M_2$) according to a HARQ-ACK mapping table (e.g., Tables 15-16 illustrated in FIGS. 28-29) with bundling window size M=$M_2$ when more than one CC is configured.

FIG. 30 (i.e., Table 17) illustrates a transmission of HARQ-ACK multiplexing for M=4. FIG. 31 (i.e., Table 18) illustrates a transmission of HARQ-ACK multiplexing for M=3. FIG. 32 (i.e., Table 19) illustrates a HARQ-ACK mapping table for PUCCH format 1b with channel selection (CS) for primary component carrier (PCC) and secondary component carrier (SCC) including constellation bits (e.g., b0, b1, b2, and b3) values (e.g., A for ACK, N for NACK, D for discontinuous transmission (DTX), and D/N for DTX/NACK) and PUCCH ACK/NACK (NN) resources (e.g., h #) for reference signals (RS) and data with data constants (const.) using 1-4 bits (e.g., M=1, M=2, M=3, or M=4) representing a HARQ-ACK bundling window.

Table 17 (i.e., FIG. 30) can summarize a legacy HARQ-ACK mapping table for more than one configured serving cell case. As shown in Table 17, an overlapped state can occur for both of 'N, any, any, any" and "A, D/N, any, any except for A, D, D, D" (last row of Table 17). An overlap state can occur when a state represents more than one state. Taking into account the overlap mapped state in Table 17, some performance degradations on the serving cell characteristic of the smaller bundling window size can occur due to 'DTX' state padding in the first solution above.

For instance, padding additional HARQ-ACK states with 'DTX' can result in the HARQ-ACK state being unknown at a node (e.g., eNB) side and therefore the scheduling of PDSCHs on PCell can be potentially restricted at the eNB resulting in substantial DL throughput loss as the PCell may not be practically usable. In another example, carrier aggregation functionality can be severely impacted or almost disabled implicitly when "DTX" padding method (e.g., first solution) is used for PUCCH format 1b with channel selection.

Based on the issue with the described "DTX" padding method, some mechanisms and solutions (e.g., method 3 or 4) can be used to alleviate the issue to enable CA functionality when PUCCH format 1b with channel selection and more than one CC with different UL-DL configurations are configured for the UE.

Figure 18:
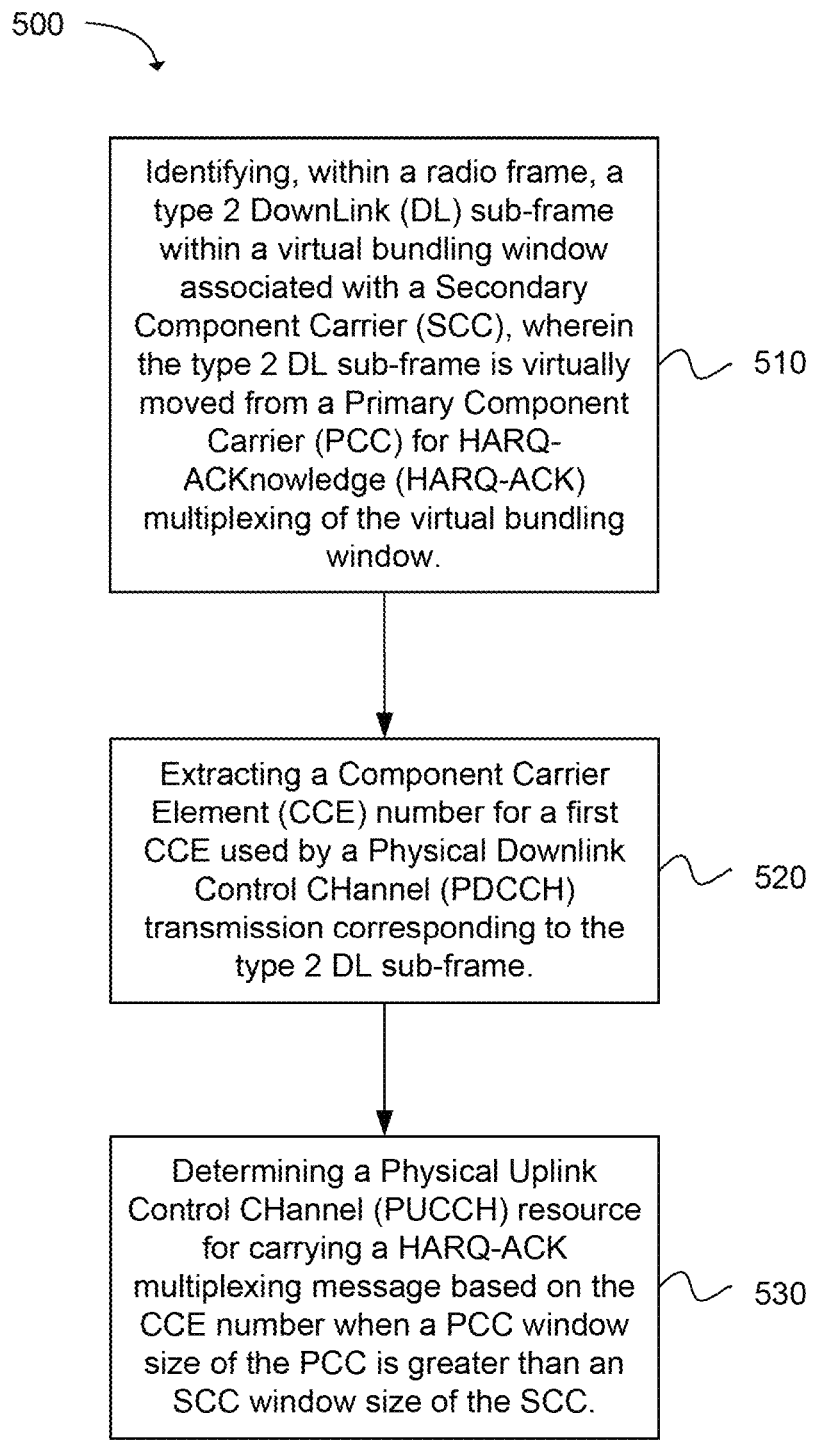
FIG. 18 depicts a flow chart of a method to support implicit mapping for Hybrid Automatic Retransmission re-Quest (HARQ) with Carrier Aggregation (CA) at a User Equipment (UE) in accordance with an example.

Another example provides a method 500 to support implicit mapping for Hybrid Automatic Retransmission reQuest (HARQ) with Carrier Aggregation (CA) at a User Equipment (UE), as shown in the flow chart in FIG. 18. The method may be executed as instructions on a machine, computer circuitry, or a processor for the UE, where the instructions are included on at least one computer readable medium or one non-transitory machine readable storage medium. The method includes the operation of identifying, within a radio frame, a type 2 DownLink (DL) sub-frame within a virtual bundling window associated with a Secondary Component Carrier (SCC), wherein the type 2 DL sub-frame is virtually moved from a Primary Component Carrier (PCC) for HARQ-ACKnowledge (HARQ-ACK) multiplexing of the virtual bundling window, as in block 510. The operation of extracting a Component Carrier Element (CCE) number for a first CCE used by a Physical Downlink Control CHannel (PDCCH) transmission corresponding to the type 2 DL sub-frame follows, as in block 520. The next operation of the method can be determining a Physical Uplink Control CHannel (PUCCH) resource for carrying a HARQ-ACK multiplexing message based on the CCE number when a PCC window size of the PCC is greater than an SCC window size of the SCC, as in block 530.

In an example, a selected number of DL sub-frames from the second bundling window can be selected from an end of the second bundling window and added to an end of DL sub-frames in the first bundling window. The first bundling window and the second bundling window can include multiple DL sub-frame sets associated with one UpLink (UL) sub-frame to carry the HARQ-ACK feedback according to Third Generation Partnership Project (3GPP) Long Term Evolution (LTE) standard Release 10 (or Release 11) for cell-specific Physical Downlink Shared CHannel (PDSCH) HARQ timing.

In another example, the method can further include: Extracting a Downlink Assignment Index (DAI) value from the PDCCH transmission corresponding to the type 2 DL sub-frame; and assigning the PUCCH resource to a channel value used in a legacy mapping table for HARQ-ACK multiplexing using the DAI value. the PUCCH resource $n_{PUCCH,i}^{(2)}$ associated with the type 2 DL sub-frame is represented by $n_{PUCCH,i}^{(2)}=(M-m-1) \times N_p + m \times N_{p+1} + n_{CCE} + N_{PUCCH}^{(i)}$, or an integer i where ($0 \leq i \leq M-1$), $N_{PUCCH}^{(1)}$ is configured by a higher layer, $N_p = \max\{0, \lfloor [N_{RB}^{DL} \times (N_{sc}^{RB} \times p-4)]/36 \rfloor\}$, max{ } is a maximum function, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, p is a value out of {0, 1, 2, 3} which makes $N_p \leq n_{CCE} < N_{p+1}$, m is an index value of type 2 subframe within the bundling window on the PCC before removing the type 2 subframe to construct the virtual bundling window, $n_{CCE}$ is a number of a first control channel element (CCE) used for transmission of a corresponding PDCCH in the type-2 subframe 'i', M=$M_p$ indicates a bundling window size before removing the type 2 subframe to construct the virtual bundling window, and $M_p$ represents the bundling window size for the PCC before removing the type 2 subframe to construct the virtual bundling window In another configuration, the method can further include: Receiving a type 2 Physical Downlink Shared CHannel (PDSCH) transmission indicated by a corresponding PDCCH; or receiving a DL Semi-Persistent Scheduling (SPS) release indicated by a corresponding PDCCH. In another example, the method can further include mapping the virtual bundling window to a legacy HARQ-ACK table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standards (e.g., Tables 9-14 illustrated in FIGS. 22-27).

Figure 19:
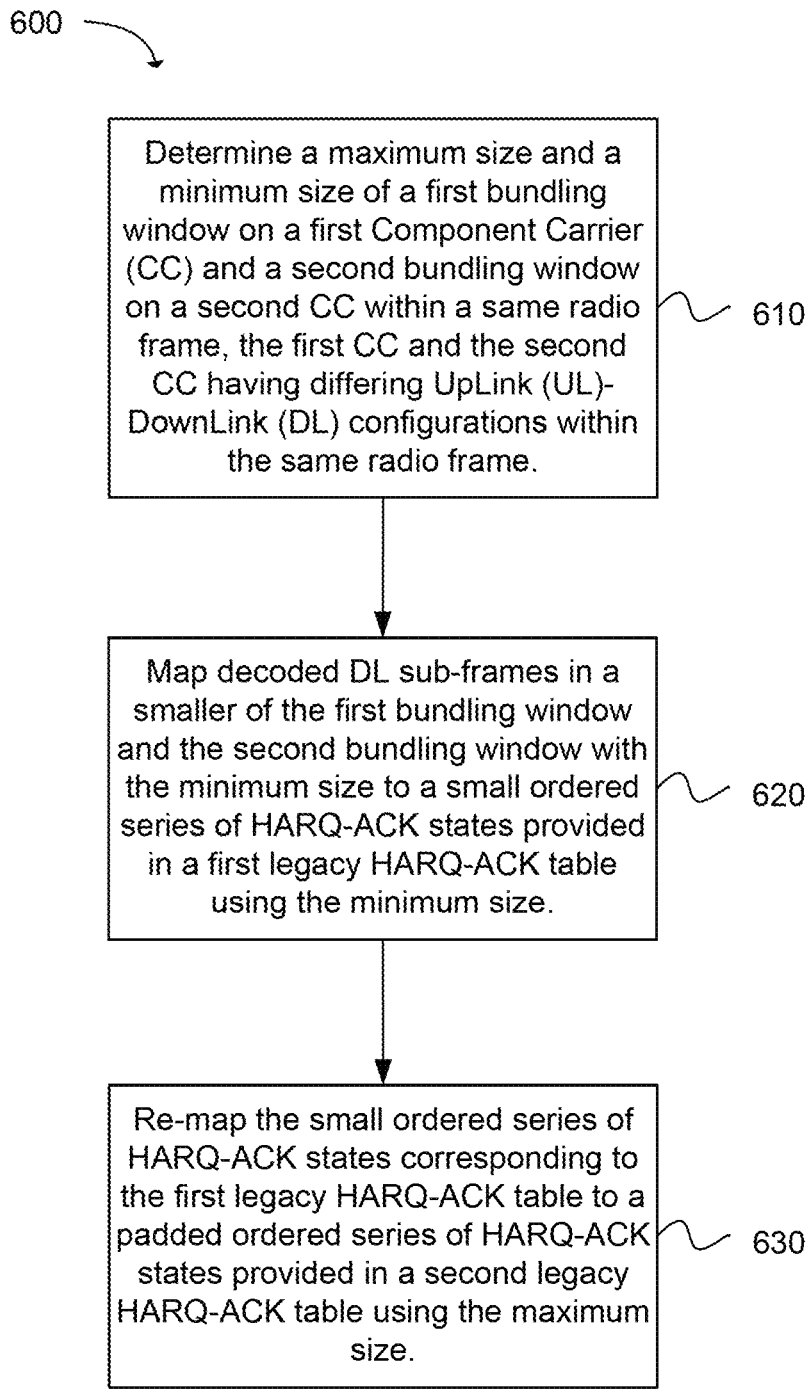
FIG. 19 depicts functionality of computer circuitry of a user equipment (UE) operable to provide Hybrid Automatic Retransmission re-Quest-ACKnowledge (HARQ-ACK) responses in accordance with an example.

Another example provides functionality 600 of computer circuitry of a processor on a user equipment (UE) operable to provide Hybrid Automatic Retransmission re-Quest-AC-Knowledge (HARQ-ACK) responses, as shown in the flow chart in FIG. 19. The functionality may be implemented as a method or the functionality may be executed as instructions on a machine, where the instructions are included on at least one computer readable medium or one non-transitory machine readable storage medium. The computer circuitry can be configured to determine a maximum size and a minimum size of a first bundling window on a first Component Carrier (CC) and a second bundling window on a second CC within a same radio frame, the first CC and the second CC having differing UpLink (UL)-DownLink (DL) configurations within the same radio frame, as in block 610. The computer circuitry can be further configured to map decoded DL sub-frames in a smaller of the first bundling window and the second bundling window with the minimum size to a small ordered series of HARQ-ACK states provided in a first legacy HARQ-ACK table using the minimum size, as in block 620. The computer circuitry can also be configured to re-map the small ordered series of HARQ-ACK states corresponding to the first legacy HARQ-ACK table to a padded ordered series of HARQ-ACK states provided in a second legacy HARQ-ACK table using the maximum size, as in block 630.

In an example, the computer circuitry configured to re-map the first ordered series of HARQ-ACK states can be further configured to: Pad the small ordered series of HARQ-ACK states with a number of instances of a predetermined HARQ-ACK state to form the padded ordered series of HARQ-ACK states; map the padded ordered series of HARQ-ACK states corresponding to the small ordered series of HARQ-ACK states using the second legacy HARQ-ACK table when the first ordered series does not include both an ACK state and a Negative ACK (NACK) state and the minimum is not two; and re-map the first ordered series of HARQ-ACK states to a predefined ordered series of HARQ-ACK states corresponding to the second legacy HARQ-ACK table when the minimum is two and the first ordered series includes both the ACK state and at least one of the NACK state and a Discontinuous Transmission (DTX) state.

In another example, the computer circuitry configured to re-map the first ordered series of HARQ-ACK states to the predefined ordered series of HARQ-ACK states for the minimum size of two and the maximum size of four can be further configured to: Determine a case when the first ordered series of HARQ-ACK states comprises HARQ-ACK(0), HARQ-ACK(1) equal to one of one of "ACK, NACK", "ACK, DTX", and "NACK, ACK", as provided in the first legacy HARQ-ACK table; re-map the first ordered series of HARQ-ACK states to the predefined ordered series of HARQ-ACK states comprising HARQ-ACK(0), HARQ-ACK(1), HARQ-ACK(2), HARQ-ACK(3) equal to one of "ACK, ACK, ACK, NACK" and "ACK, ACK, ACK, DTX", as provided by the second legacy HARQ-ACK table, when HARQ-ACK(0), HARQ-ACK(1) of the first ordered series of HARQ-ACK states equals "ACK, NACK" or "ACK, DTX"; and re-map the first ordered series of HARQ-ACK states to the predefined ordered series of HARQ-ACK states comprising HARQ-ACK(0), HARQ-ACK(1), HARQ-ACK(2), HARQ-ACK(3) equal to one of "ACK, DTX, DTX, DTX", as provided by the second legacy HARQ-ACK table, when HARQ-ACK(0), HARQ-ACK(1) of the first ordered series of HARQ-ACK states comprises HARQ-ACK(0), HARQ-ACK(1), HARQ-ACK(2), HARQ-ACK(3) equal to one of "ACK, DTX, DTX, DTX", as provided by the second legacy HARQ-ACK table, when HARQ-ACK(0), HARQ-ACK(1) of the first ordered series of HARQ-ACK states equals "NACK, ACK".

In another example, the computer circuitry configured to re-map the first ordered series of HARQ-ACK states to the predefined ordered series of HARQ-ACK states for the minimum size of two and the maximum size of three can be further configured to: Determine a case when the first ordered series of HARQ-ACK states comprises HARQ-ACK(0), HARQ-ACK(1) equal to "NACK, ACK", as provided in the first legacy HARQ-ACK table; and re-map the first ordered series of HARQ-ACK states to the predefined ordered series of HARQ-ACK states comprising HARQ-ACK(0), HARQ-ACK(1), HARQ-ACK(2), equal to "ACK, ACK, ACK", as provided by the second legacy HARQ-ACK table, when HARQ-ACK(0), HARQ-ACK(1) of the first ordered series of HARQ-ACK states equals "NACK, ACK".

In another configuration, the computer circuitry can be further configured to perform spatial HARQ-ACK bundling across multiple codewords within DL sub-frames in the radio frame, when a corresponding Transmission Mode (TM) on at least one of the first CC and the second CC supports up to two Transmission Blocks (TBs) per sub-frame, and the minimum size does not equal zero and the maximum size does not equal one on a CC with a TM supporting up to two TBs.

In another example, the computer circuitry can be further configured to: Perform channel selection using a channel value corresponding to the padded or predefined ordered series of HARQ-ACK states provided in the second legacy HARQ-ACK table; and prepare a Physical Uplink Control CHannel (PUCCH) format 1b message with a constellation point consistent with the padded or predefined ordered series of HARQ-ACK states provided in the second legacy HARQ-ACK table for transmission on a channel consistent with the channel selection.

In another configuration, the computer circuitry can be further configured to: select the first legacy HARQ-ACK table and the second legacy HARQ-ACK table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standards (e.g., Tables 9-14 illustrated in FIGS. 22-27) based on the minimum size for the first legacy HARQ-ACK table and the maximum size for the second legacy HARQ-ACK table.

In another example, the computer circuitry can be further configured to determine the number of instances of the predetermined HARQ-ACK state by which to pad the first series of ordered HARQ-ACK states as equal to the maximum size less the minimum size when spatial bundling is performed or one of the first CC and the second CC with the minimum size is configured for a single Transmission Block (TB) per DL sub-frame within the radio frame.

In another configuration, the computer circuitry can be further configured to determine the number of instances of the predetermined HARQ-ACK state by which to pad the first series of ordered HARQ-ACK states as equal to twice the maximum size less twice the minimum size where one of the first CC and the second CC with the minimum size is configured for two Transmission Blocks (TBs) per DL sub-frame within the radio frame and spatial bundling has not been performed. In another example, the predetermined HARQ-ACK state is Discontinuous Transmission (DTX).

Figure 20:
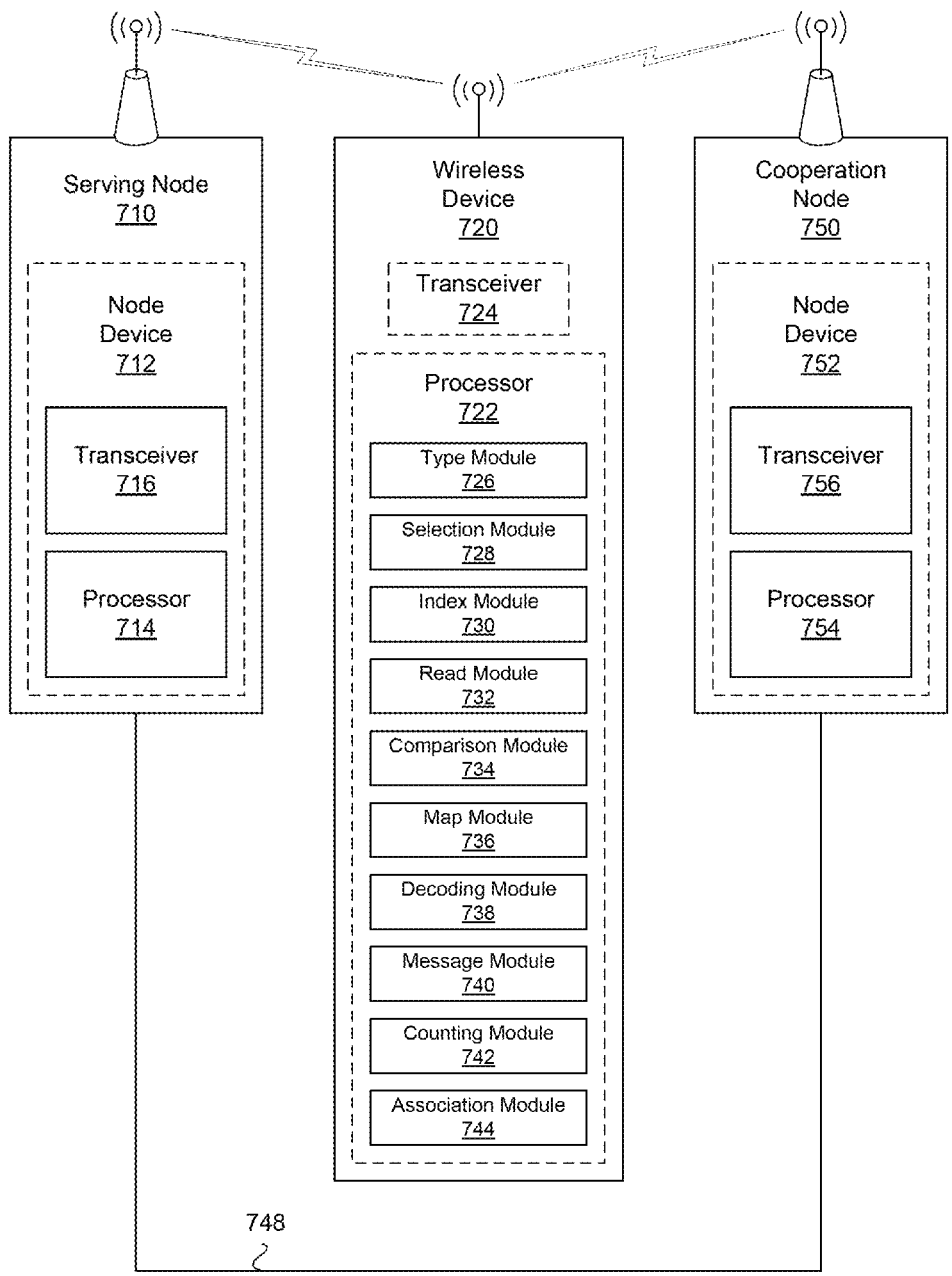
FIG. 20 illustrates a block diagram of a serving node, a coordination node, and wireless device in accordance with an example.

FIG. 20 illustrates an example node (e.g., serving node 710 and cooperation node 750) and an example wireless device 720. The node can include a node device 712 and 752. The node device or the node can be configured to communicate with the wireless device. The node device can be configured to support Hybrid Automatic Retransmission re-Quest (HARQ) for Carrier Aggregation (CA). The node device or the node can be configured to communicate with other nodes via a backhaul link 748 (optical or wired link), such as an X2 application protocol (X2AP). The node device can include a processor 714 and 754 and a transceiver 716 and 756. The transceiver can be configured to receive a HARQ-ACK feedback in a PUCCH resource. The transceiver 716 and 756 can be further configured to communicate with the coordination node via an X2 application protocol (X2AP). The processor can be further configured to a reverse procedure can be implemented for PUCCH detection and PDSCH retransmission as disclosed herein. The serving node can generate both the PCell and the SCell. The node (e.g., serving node 710 and cooperation node 750) can include a base station (BS), a Node B (NB), an evolved Node B (eNB), a baseband unit (BBU), a remote radio head (RRH), a remote radio equipment (RRE), a remote radio unit (RRU), or a central processing module (CPM).

The wireless device 720 can include a transceiver 724 and a processor 722. The wireless device (i.e., device) can be configured to support explicit mapping for Hybrid Automatic Retransmission re-Quest (HARQ) for Carrier Aggregation (CA). The processor can include a type module 726, a selection module 728, an index module 730, a read module 732, a comparison module 734, a map module 736, a decoding module 738, a message module 740, a counting module 742, and an association module 744.

The type module 726 can be configured to detect a type 2 set of DownLink (DL) sub-frames of a radio frame for a virtual HARQ-ACKnowledge (HARQ-ACK) bundling window. The HARQ-ACK bundling window can comprise a type 1 set of DL sub-frames transmitted from a first Component Carrier (CC) and the type 2 set of DL sub-frames transmitted from an additional CC, and the type 2 set can be bundled with a HARQ-ACK bundling window for the first CC. The selection module 728 can be configured to select a set of Physical Uplink Control CHannel (PUCCH) resources from multiple sets of PUCCH resources configured by Radio Resource Control (RRC) signaling depending on the Transmit Power Control (TPC) field value in the Downlink Control Information (DCI) format of a corresponding Physical Downlink Control CHannel (PDCCH). Each PUCCH resource in the set can have a one-to-one relationship associated with a DL frame in the type 2 set. The index module 730 can be configured to index a PUCCH resource to a channel value used in a legacy mapping table for HARQ-ACK multiplexing, wherein the PUCCH resource includes HARQ-ACK feedback for the type 2 set of the DL sub-frames.

In another example, read module 732 can be configured to read a Downlink Assignment Index (DAI) value in a PDCCH transmission corresponding to the DL sub-frame in the one-to-one relationship. The comparison module 734 can be configured to determine a larger window size between a HARQ-ACK bundling window for a Primary CC (PCC) with a PCC window size $M_p$ and a HARQ-ACK bundling window for a Secondary CC (SCC) with a SCC window size $M_s$. Each of the first CC and the additional CC can be one of the PCC or the SCC to the exclusion of the other. The index module 730 can be further configured where the DAI value is equal to one of one and two, to index a PUCCH resource in the one-to-one relationship to one of: A channel value equal to the DAI value minus one, where the SCC window size $M_s$ is the larger window size; or a channel value equal to the DAI value plus one, where the PCC window size $M_p$ is the larger window size.

In another example, read module 732 can be configured to determine that a Semi-Persistent Scheduling (SPS) DL sub-frame in the type 2 set carries a Physical Downlink Shared CHannel (PDSCH) transmission without a corresponding Physical Downlink Control CHannel (PDCCH) transmission. The comparison module 734 can be configured determine a larger window size between a HARQ-ACK bundling window for a Primary CC (PCC) with a PCC window size $M_p$ and a HARQ-ACK bundling window for a Secondary CC (SCC) with a SCC window size $M_s$. Each of the first CC and the additional CC being one of the PCC or the SCC to the exclusion of the other. The selection module 728 can be further configured to select a set of Physical Uplink Control CHannel (PUCCH) resources from four sets of PUCCH resources with a PUCCH resource comprising a channel in a one-to-one relationship with the SPS DL sub-frame. The index module 730 can be further configured to index a PUCCH resources in the one-to-one relationship with the SPS DL sub-frame to a channel value for HARQ-ACK multiplexing according to the legacy mapping table for HARQ-ACK multiplexing when $M_p \geq M_s + 2$.

In another example, the map module 736 can be configured to select a mapped state from the legacy mapping table for HARQ-ACK multiplexing corresponding to HARQ-ACK states for DL sub-frames in the virtual window. The map module can be further configured to interpret a HARQ state for the SPS DL sub-frame as corresponding to a HARQ-ACK (0) position on the legacy mapping table for HARQ-ACK multiplexing. The index module can be further configured to index a PUCCH resource $n_{PUCCH,3}^{(1)}$ represented by $n_{PUCCH,3}^{(1)} = n_{PUCCH,i}^{(2)}$ when a Downlink Assignment Index (DAI) value equals one is detected in the PDCCH of the type 2 sub-frame i where ($0 \leq i \leq M-1$).

In another configuration, the decoding module 738 can be configured to generate HARQ-ACK states from the DL sub-frames on the first CC and the additional CC. The map module 736 can be configured to: Select the legacy mapping table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standards e.g., Tables 9-14 illustrated in FIGS. 22-27) based on a size of the virtual bundling window; and select a first mapped state from the legacy mapping table corresponding to HARQ-ACK states for DL sub-frames in the virtual window for two CCs. The message module 740 can be configured to embed a constellation point corresponding to the first mapped state in a PUCCH format 1b message on a PUCCH resource indexed to a PUCCH resource channel value corresponding to the first mapped state.

In another example, the counting module 742 can be configured to assign a unique number M to a DL sub-frame in the type 2 set represented by $$M = \min\left\{\frac{|M_p - M_s|}{2}, 2\right\}$$

where min{ } is a mimimum function, $M_p$ represents the bundling window size for a HARQ-ACK bundling window for a Primary CC (PCC) before removing the type 2 subframe to construct the virtual bundling window, and $M_s$ represents the bundling window size for a HARQ-ACK bundling window for a Secondary CC(SCC) before removing the type 2 subframe to construct the virtual bundling window. Each of the first CC and the additional CC can be one of the PCC or the SCC to the exclusion of the other. The association module 744 can be configured to associate the DL sub-frame in the type 2 set to a PUCCH resource in the set of PUCCH resources, selected by the selection module, based on the DAI value assigned to the DL sub-frame and TPC field value in the DCI format of the Physical Downlink Control Channel of SCC. The index module 730 can be further configured to index the PUCCH resource to a channel value used in a legacy mapping table based in part on the unique number assigned to the DL sub-frame associated to the PUCCH resource.

In another configuration, the selection module selects a set of PUCCH resources with three PUCCH resources from four sets of PUCCH resources known to the UE, where each set of PUCCH resources in the four sets of PUCCH resources comprise three PUCCH resources when $M_p \geq M_s+2$, where $M_p$ represents the bundling window size for a HARQ-ACK bundling window for a Primary CC (PCC), and $M_s$ represents the bundling window size for a HARQ-ACK bundling window for a Secondary CC(SCC). Each of the first CC and the additional CC being one of the PCC or the SCC to the exclusion of the other.

Figure 21:
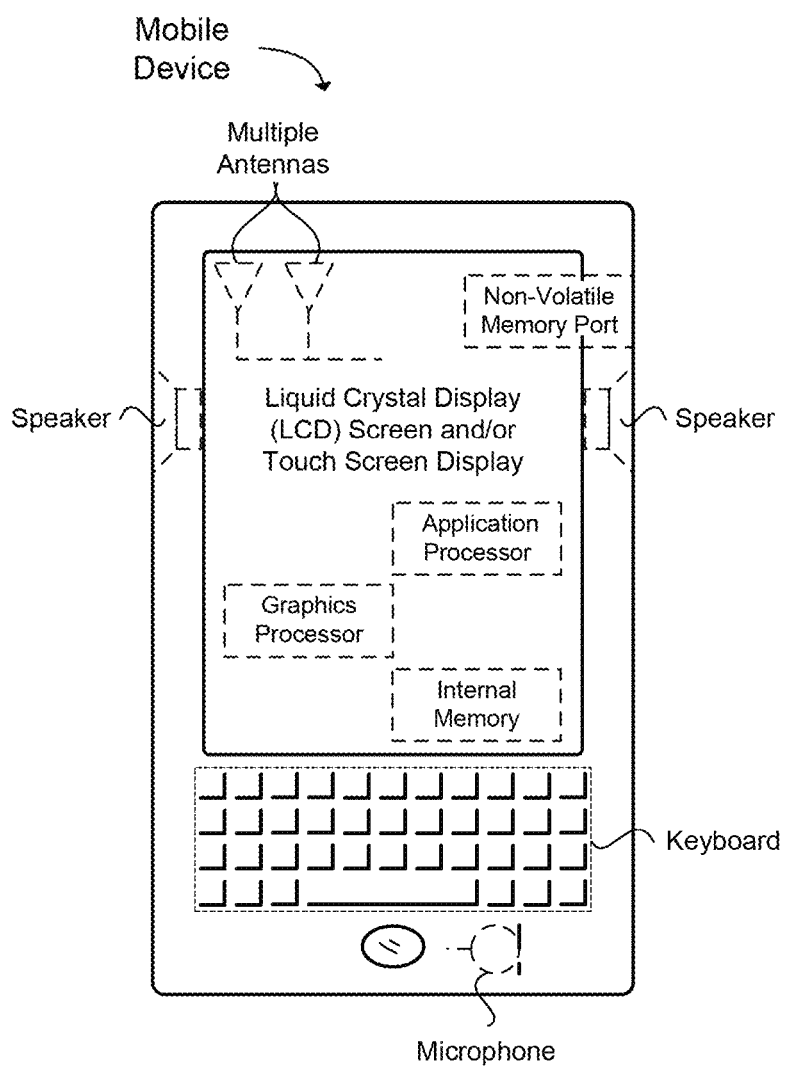
FIG. 21 illustrates a diagram of a wireless device (e.g., UE) in accordance with an example.

FIG. 21 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 21 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A User Equipment (UE) to support explicit mapping for Hybrid Automatic Retransmission re-Quest (HARQ) for Carrier Aggregation (CA), comprising:
 a type module configured to detect a type 2 set of DownLink (DL) sub-frames of a radio frame for a virtual HARQ-ACKnowledge (HARQ-ACK) bundling window, wherein the HARQ-ACK bundling window comprises a type 1 set of DL sub-frames transmitted from a first Component Carrier (CC) and the type 2 set of DL sub-frames transmitted from an additional CC, and the type 2 set is bundled with a HARQ-ACK bundling window for the first CC;
 a selection module configured to select a set of Physical Uplink Control CHannel (PUCCH) resources from multiple sets of PUCCH resources configured by Radio Resource Control (RRC) signaling depending on the Transmit Power Control (TPC) field value in the Downlink Control Information (DCI) format of a corresponding Physical Downlink Control CHannel (PDCCH), wherein each PUCCH resource in the set has a one-to-one relationship associated with a DL frame in the type 2 set; and
 an index module configured to index a PUCCH resource to a channel value used in a legacy mapping table for HARQ-ACK multiplexing, wherein the PUCCH resource includes HARQ-ACK feedback for the type 2 set of the DL sub-frames.

2. The UE of claim 1, further comprising:
 a read module configured to read a Downlink Assignment Index (DAI) value in a PDCCH transmission corresponding to the DL sub-frame in the one-to-one relationship;
 a comparison module configured to determine a larger window size between a HARQ-ACK bundling window for a Primary CC (PCC) with a PCC window size $M_p$ and a HARQ-ACK bundling window for a Secondary CC(SCC) with a SCC window size $M_s$, wherein each of the first CC and the additional CC being one of the PCC or the SCC to the exclusion of the other; and
 the index module further configured, where the DAI value is equal to one of one and two, to index a PUCCH resource in the one-to-one relationship to one of:
  a channel value equal to the DAI value minus one, where the SCC window size $M_s$ is the larger window size; or
  a channel value equal to the DAI value plus one, where the PCC window size $M_p$ is the larger window size.

3. The UE of claim 1, further comprising:
 a read module configured to determine that a Semi-Persistent Scheduling (SPS) DL sub-frame in the type 2 set carries a Physical Downlink Shared CHannel (PDSCH) transmission without a corresponding Physical Downlink Control CHannel (PDCCH) transmission;
 a comparison module configured to determine a larger window size between a HARQ-ACK bundling window for a Primary CC (PCC) with a PCC window size $M_p$ and a HARQ-ACK bundling window for a Secondary CC(SCC) with a SCC window size $M_s$, wherein each of the first CC or the additional CC being one of the PCC and the SCC to the exclusion of the other;
 the selection module is further configured to select a set of Physical Uplink Control CHannel (PUCCH) resources from four sets of PUCCH resources with a PUCCH resource comprising a channel in a one-to-one relationship with the SPS DL sub-frame; and
 the index module is further configured to index a PUCCH resources in the one-to-one relationship with the SPS DL sub-frame to a channel value for HARQ-ACK multiplexing according to the legacy mapping table for HARQ-ACK multiplexing when $M_p \geq M_s + 2$.

4. The UE of claim 3, further comprising:
 a map module configured to select a mapped state from the legacy mapping table for HARQ-ACK multiplexing corresponding to HARQ-ACK states for DL sub-frames in the virtual window, wherein the map module is further configured to interpret a HARQ state for the SPS DL sub-frame as corresponding to a HARQ-ACK(0) position on the legacy mapping table for HARQ-ACK multiplexing.

5. The UE of claim 3, wherein the index module is further configured to index a PUCCH resource $n_{PUCCH,3}^{(1)}$ represented by $n_{PUCCH,3}^{(1)} = n_{PUCCH,i}^{(2)}$ when a Downlink Assignment Index (DAI) value equals one is detected in the PDCCH of the type 2 sub-frame i where ($0 \leq i \leq M-1$).

6. The UE of claim 1, further comprising:
  a decoding module configured to generate HARQ-ACK states from the DL sub-frames on the first CC and the additional CC;
  a map module configured to:
    select the legacy mapping table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standards based on a size of the virtual bundling window; and
    select a first mapped state from the legacy mapping table corresponding to HARQ-ACK states for DL sub-frames in the virtual window for two CCs; and
  a message module configured to embed a constellation point corresponding to the first mapped state in a PUCCH format 1b message on a PUCCH resource indexed to a PUCCH resource channel value corresponding to the first mapped state.

7. The UE of claim 1, further comprising:
  a counting module configured to assign a unique number M to a DL sub-frame in the type 2 set represented by $$M = \min\left\{\frac{|M_p - M_s|}{2}, 2\right\}$$

where min{ } is a minimum function, $M_p$ represents the bundling window size for a HARQ-ACK bundling window for a Primary CC (PCC) before removing the type 2 subframe to construct the virtual bundling window, and $M_s$ represents the bundling window size for a HARQ-ACK bundling window for a Secondary CC(SCC) before removing the type 2 subframe to construct the virtual bundling window, wherein each of the first CC and the additional CC being one of the PCC or the SCC to the exclusion of the other; and
    an association module configured to associate the DL sub-frame in the type 2 set to a PUCCH resource in the set of PUCCH resources, selected by the selection module, based on the DAI value assigned to the DL sub-frame and TPC field value in the DCI format of the Physical Downlink Control Channel of SCC; wherein:
    the index module is further configured to index the PUCCH resource to a channel value used in a legacy mapping table based in part on the unique number assigned to the DL sub-frame associated to the PUCCH resource.

8. The UE of claim 1, wherein the selection module selects a set of PUCCH resources with three PUCCH resources from four sets of PUCCH resources known to the UE, each set of PUCCH resources in the four sets of PUCCH resources comprising three PUCCH resources when $M_p \geq M_s+2$, where $M_p$ represents the bundling window size for a HARQ-ACK bundling window for a Primary CC (PCC), and $M_s$ represents the bundling window size for a HARQ-ACK bundling window for a Secondary CC(SCC), wherein each of the first CC and the additional CC being one of the PCC or the SCC to the exclusion of the other.

9. A method to support implicit mapping for Hybrid Automatic Retransmission re-Quest (HARQ) with Carrier Aggregation (CA) at a User Equipment (UE), comprising:
  identifying, within a radio frame, a type 2 DownLink (DL) sub-frame within a virtual bundling window associated with a Secondary Component Carrier (SCC), wherein the type 2 DL sub-frame is virtually moved from a Primary Component Carrier (PCC) for HARQ-ACKnowledge (HARQ-ACK) multiplexing of the virtual bundling window;
  extracting a Component Carrier Element (CCE) number for a first CCE used by a Physical Downlink Control CHannel (PDCCH) transmission corresponding to the type 2 DL sub-frame; and
  determining a Physical Uplink Control CHannel (PUCCH) resource for carrying a HARQ-ACK multiplexing message based on the CCE number when a PCC window size of the PCC is greater than an SCC window size of the SCC.

10. The method of claim 9, further comprising:
  extracting a Downlink Assignment Index (DAI) value from the PDCCH transmission corresponding to the type 2 DL sub-frame; and
  assigning the PUCCH resource to a channel value used in a legacy mapping table for HARQ-ACK multiplexing using the DAI value.

11. The method of claim 9, wherein the PUCCH resource $n_{PUCCH,i}^{(2)}$ associated with the type 2 DL sub-frame is represented by $n_{PUCCH,i}^{(2)}=(M-m-1)\times N_p+m\times N_{p+1}+n_{CCE}+N_{PUCCH}^{(1)}$, for an integer i where ($0\leq i\leq M-1$), $N_{PUCCH}^{(1)}$ is configured by a higher layer, $N_p=\max\{0,\lfloor[N_{RB}^{DL}\times(N_{sc}^{RB}\times p-4)]/36\rfloor\}$, max{ } is a maximum function, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, p is a value out of {0, 1, 2, 3} which makes $N_p \leq n_{CCE} < N_{p+1}$, m is an index value of type 2 subframe within the bundling window on the PCC before removing the type 2 subframe to construct the virtual bundling window, $n_{CCE}$ is a number of a first control channel element (CCE) used for transmission of a corresponding PDCCH in the type-2 subframe 'i', $M=M_p$ indicates a bundling window size before removing the type 2 subframe to construct the virtual bundling window, and $M_p$ represents the bundling window size for the PCC before removing the type 2 subframe to construct the virtual bundling window.

12. The method of claim 9, further comprising:
  receiving a type 2 Physical Downlink Shared CHannel (PDSCH) transmission indicated by a corresponding PDCCH; or
  receiving a DL Semi-Persistent Scheduling (SPS) release indicated by a corresponding PDCCH.

13. The method of claim 9, further comprising:
  mapping the virtual bundling window to a legacy HARQ-ACK table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standard.

14. A user equipment (UE) operable to provide Hybrid Automatic Retransmission re-Quest-ACKnowledge (HARQ-ACK) responses, having computer circuitry configured to:
  determine a maximum size and a minimum size of a first bundling window on a first Component Carrier (CC) and a second bundling window on a second CC within a same radio frame, the first CC and the second CC having differing UpLink (UL)-DownLink (DL) configurations within the same radio frame;
  map decoded DL sub-frames in a smaller of the first bundling window and the second bundling window with the minimum size to a small ordered series of HARQ-ACK states provided in a first legacy HARQ-ACK table using the minimum size; and re-map the small ordered series of HARQ-ACK states corresponding to the first legacy HARQ-ACK table to a padded ordered series of HARQ-ACK states provided in a second legacy HARQ-ACK table using the maximum size.

15. The computer circuitry of claim 14, wherein computer circuitry configured to re-map the first ordered series of HARQ-ACK states is further configured to:
pad the small ordered series of HARQ-ACK states with a number of instances of a predetermined HARQ-ACK state to form the padded ordered series of HARQ-ACK states;
map the padded ordered series of HARQ-ACK states corresponding to the small ordered series of HARQ-ACK states using the second legacy HARQ-ACK table when the first ordered series does not include both an ACK state and a Negative ACK (NACK) state and the minimum is not two; and
re-map the first ordered series of HARQ-ACK states to a predefined ordered series of HARQ-ACK states corresponding to the second legacy HARQ-ACK table when the minimum is two and the first ordered series includes both the ACK state and at least one of the NACK state and a Discontinuous Transmission (DTX) state.

16. The computer circuitry of claim 15, wherein computer circuitry configured to re-map the first ordered series of HARQ-ACK states to the predefined ordered series of HARQ-ACK states for the minimum size of two and the maximum size of four is further configured to:
determine a case when the first ordered series of HARQ-ACK states comprises HARQ-ACK(0), HARQ-ACK(1) equal to one of one of "ACK, NACK", "ACK, DTX", and "NACK, ACK", as provided in the first legacy HARQ-ACK table;
re-map the first ordered series of HARQ-ACK states to the predefined ordered series of HARQ-ACK states comprising HARQ-ACK(0), HARQ-ACK(1), HARQ-ACK(2), HARQ-ACK(3) equal to "ACK, DTX, DTX, DTX", as provided by the second legacy HARQ-ACK table, when HARQ-ACK(0), HARQ-ACK(1) of the first ordered series of HARQ-ACK states equals "ACK, NACK" or "ACK, DTX"; and
re-map the first ordered series of HARQ-ACK states to the predefined ordered series of HARQ-ACK states comprising HARQ-ACK(0), HARQ-ACK(1), HARQ-ACK(2), HARQ-ACK(3) equal to one of "ACK, ACK, ACK, NACK" and "ACK, ACK, ACK, DTX", as provided by the second legacy HARQ-ACK table, when HARQ-ACK(0), HARQ-ACK(1) of the first ordered series of HARQ-ACK states equals "NACK, ACK".

17. The computer circuitry of claim 15, wherein computer circuitry configured to re-map the first ordered series of HARQ-ACK states to the predefined ordered series of HARQ-ACK states for the minimum size of two and the maximum size of four is further configured to:
determine a case when the first ordered series of HARQ-ACK states comprises HARQ-ACK(0), HARQ-ACK(1) equal to one of one of "ACK, NACK", "ACK, DTX", and "NACK, ACK", as provided in the first legacy HARQ-ACK table;
re-map the first ordered series of HARQ-ACK states to the predefined ordered series of HARQ-ACK states comprising HARQ-ACK(0), HARQ-ACK(1), HARQ-ACK(2), HARQ-ACK(3) equal to one of "ACK, ACK, ACK, NACK" and "ACK, ACK, ACK, DTX", as provided by the second legacy HARQ-ACK table, when HARQ-ACK(0), HARQ-ACK(1) of the first ordered series of HARQ-ACK states equals "ACK, NACK" or "ACK, DTX"; and
re-map the first ordered series of HARQ-ACK states to the predefined ordered series of HARQ-ACK states comprising HARQ-ACK(0), HARQ-ACK(1), HARQ-ACK(2), HARQ-ACK(3) equal to "ACK, DTX, DTX, DTX", as provided by the second legacy HARQ-ACK table, when HARQ-ACK(0), HARQ-ACK(1) of the first ordered series of HARQ-ACK states equals "NACK, ACK".

18. The computer circuitry of claim 15, wherein computer circuitry configured to re-map the first ordered series of HARQ-ACK states to the predefined ordered series of HARQ-ACK states for the minimum size of two and the maximum size of three is further configured to:
determine a case when the first ordered series of HARQ-ACK states comprises HARQ-ACK(0), HARQ-ACK(1) equal to "NACK, ACK", as provided in the first legacy HARQ-ACK table; and
re-map the first ordered series of HARQ-ACK states to the predefined ordered series of HARQ-ACK states comprising HARQ-ACK(0), HARQ-ACK(1), HARQ-ACK(2), equal to "ACK, ACK, ACK", as provided by the second legacy HARQ-ACK table, when HARQ-ACK(0), HARQ-ACK(1) of the first ordered series of HARQ-ACK states equals "NACK, ACK".

19. The computer circuitry of claim 15, further comprising computer circuitry configured to:
perform spatial HARQ-ACK bundling across multiple codewords within DL sub-frames in the radio frame, when a corresponding Transmission Mode (TM) on at least one of the first CC and the second CC supports up to two Transmission Blocks (TBs) per sub-frame, and the minimum size does not equal zero and the maximum size does not equal one on a CC with a TM supporting up to two TBs.

20. The computer circuitry of claim 15, further comprising computer circuitry configured to:
perform channel selection using a channel value corresponding to the padded or predefined ordered series of HARQ-ACK states provided in the second legacy HARQ-ACK table; and
prepare a Physical Uplink Control CHannel (PUCCH) format 1b message with a constellation point consistent with the padded or predefined ordered series of HARQ-ACK states provided in the second legacy HARQ-ACK table for transmission on a channel consistent with the channel selection.

21. The computer circuitry of claim 20, further comprising computer circuitry configured to:
select the first legacy HARQ-ACK table and the second legacy HARQ-ACK table from HARQ-ACK multiplexing tables 10.1.3-2 to 10.1.3-7 specified in Technical Specification (TS) 36.213 of Release 10 of Third Generation Partnership Project (3GPP) Long Term Evolution (LTE) standards based on the minimum size for the first legacy HARQ-ACK table and the maximum size for the second legacy HARQ-ACK table.

22. The computer circuitry of claim 15, further comprising computer circuitry configured to:
determine the number of instances of the predetermined HARQ-ACK state by which to pad the first series of ordered HARQ-ACK states as equal to the maximum size less the minimum size when spatial bundling is performed or one of the first CC and the second CC with the minimum size is configured for a single Transmission Block (TB) per DL sub-frame within the radio frame.

23. The computer circuitry of claim 15, further comprising computer circuitry configured to:
   determine the number of instances of the predetermined HARQ-ACK state by which to pad the first series of ordered HARQ-ACK states as equal to twice the maximum size less twice the minimum size where one of the first CC and the second CC with the minimum size is configured for two Transmission Blocks (TBs) per DL sub-frame within the radio frame and spatial bundling has not been performed.

24. The computer circuitry of claim 15, wherein the predetermined HARQ-ACK state is Discontinuous Transmission (DTX).

* * * * *